US012576657B2

(12) United States Patent
Wada et al.

(10) Patent No.: US 12,576,657 B2
(45) Date of Patent: Mar. 17, 2026

(54) PRINTING DEVICE HAVING GUIDE CHANNEL FOR GUIDING LIQUID DISCHARGED FROM HOUSING TOWARD OUTSIDE OF THE PRINTING DEVICE

(71) Applicant: BROTHER KOGYO KABUSHIKI KAISHA, Nagoya (JP)

(72) Inventors: Tomohiro Wada, Nagoya (JP); Yusuke Ikemoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 176 days.

(21) Appl. No.: 18/614,570

(22) Filed: Mar. 22, 2024

(65) Prior Publication Data

US 2024/0326492 A1 Oct. 3, 2024

(30) Foreign Application Priority Data

Mar. 30, 2023 (JP) ................................ 2023-055140

(51) Int. Cl.

*B41J 29/13* (2006.01)
*B41J 3/407* (2006.01)
*B41J 29/02* (2006.01)
*B41J 29/12* (2006.01)
*B41J 29/17* (2006.01)
*G03G 21/16* (2006.01)

(52) U.S. Cl.

CPC ............. *B41J 29/13* (2013.01); *B41J 3/4075* (2013.01); *B41J 29/02* (2013.01); *B41J 29/12* (2013.01); *B41J 29/17* (2013.01); *G03G 21/1619* (2013.01)

(58) Field of Classification Search

CPC . B41J 29/13; B41J 3/4075; B41J 29/02; B41J 29/12; B41J 29/17; G03G 21/1619
See application file for complete search history.

(56) References Cited

U.S. PATENT DOCUMENTS

2005/0002716 A1* 1/2005 Murata .................. B41J 3/4075 400/88
2015/0139686 A1* 5/2015 Takenoshita ....... G03G 21/1633 399/107
2015/0153700 A1* 6/2015 Fujikawa ........... G03G 21/1619 399/405

FOREIGN PATENT DOCUMENTS

JP 2005-022291 A 1/2005

* cited by examiner

*Primary Examiner* — Henok D Legesse
(74) *Attorney, Agent, or Firm* — Kenealy Vaidya LLP

(57) ABSTRACT

A printing device includes a printing head, a housing, a cover, and a guide channel. The housing accommodates therein the printing head. The housing includes a bottom wall formed with a communication hole through which liquid that has entered the housing is to be discharged to an outside of the housing. The cover covers the communication hole in the bottom wall. The guide channel is positioned between the bottom wall and the cover and extends along the bottom wall. The guide channel is in communication with the communication hole and is configured to guide the liquid discharged through the communication hole toward an outside of the printing device.

15 Claims, 15 Drawing Sheets

PRINTING DEVICE HAVING GUIDE CHANNEL FOR GUIDING LIQUID DISCHARGED FROM HOUSING TOWARD OUTSIDE OF THE PRINTING DEVICE

REFERENCE TO RELATED APPLICATIONS

This application claims priority from Japanese Patent Application No. 2023-055140 filed on Mar. 30, 2023. The entire content of the priority application is incorporated herein by reference.

BACKGROUND ART

According to one conventional tape printer, a housing thereof has a lower end portion covered with a protector. In the tape printer, a tape cassette accommodating therein a tape is attached to an inside of the housing, and, after printing is performed on the tape, the printed tape is configured to be discharged to an outside of the housing through a tape discharge opening. Here, the tape discharge opening is communicated with the inside of the housing, meaning that liquid could flow into the housing through the discharge opening. To this effect, since a bottom surface of the tape printer is exposed to the outside through the protector, providing a drain hole in the bottom surface enables the liquid entered inside the housing to be discharged to the outside through the drain hole.

SUMMARY

However, the tape printer is so sized that a user can hold the same with his one hand (of a portable type), and, hence, the user does not always use the tape printer such that the bottom surface faces downward. As a result, liquid may flow into the housing through the drain hole in a case where the tape printer is arranged sideways or upside down.

In view of the foregoing, it is an object of the present disclosure to provide a printing device capable of discharging liquid out of the housing through a prescribed portion and capable of restraining entry of liquid into the housing through the prescribed portion.

In order to attain the above and other object, the present disclosure provides a printing device including a printing head, a housing, a cover, and a guide channel. The printing head is configured to perform printing on a printing medium. The housing accommodates therein the printing head. The housing has a bottom wall formed with a communication hole through which liquid that has entered the housing is to be discharged to an outside of the housing. The cover covers the communication hole in the bottom wall. The guide channel is positioned between the bottom wall and the cover and extending along the bottom wall. The guide channel is in communication with the communication hole and is configured to guide the liquid discharged through the communication hole toward an outside of the printing device.

In the printing device with the above configuration, the liquid having entered the housing is discharged to the outside of the housing through the communication hole, and thereafter, the liquid can be guided to the outside of the printing device through the guide channel. Further, entry of liquid into the interior of the housing through the communication hole can be restrained.

DESCRIPTION

Figure 1:
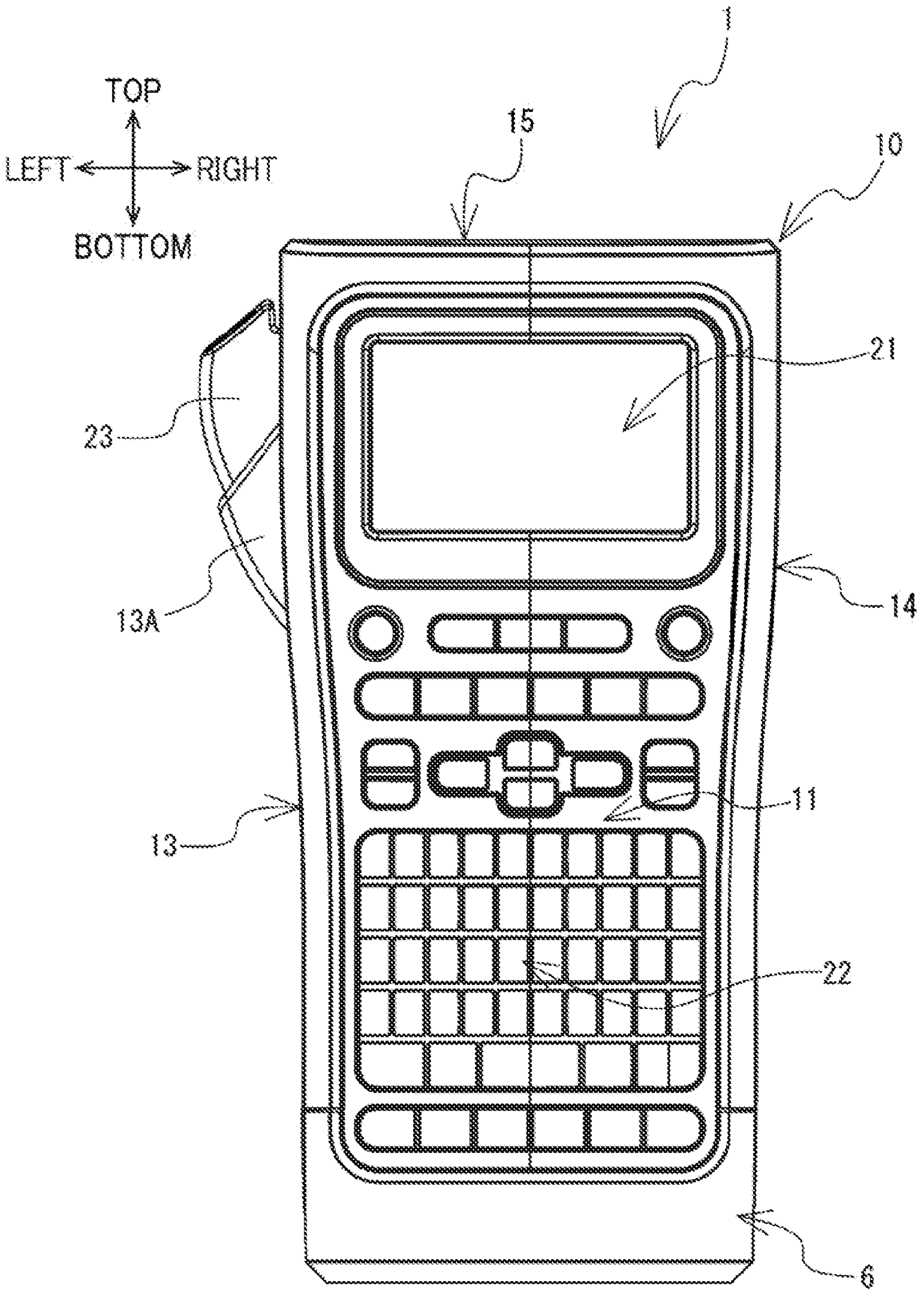
FIG. 1 is a front view of a printing device 1 according to one embodiment.

A printing device 1 according to one embodiment of the present disclosure will be described with reference to FIGS. 1 through 14.

In the following description, directions in relation to the printing device 1 (indicated in the drawings) will be referred to based on a perspective of a user who operates an input portion 22 (described later) of the printing device 1.

The printing device 1 is of a hand-held type. That is, the printing device 1 has such a size that the user can hold the printing device 1 with his single hand.

A tape cassette 17 (see FIG. 2) can be used in the printing device 1. The tape cassette 17 can be of various types, such as a receptor type, a thermal type, a laminate type, and a tubular type. The tape cassette 17 accommodates therein an elongated printing medium, such as a one-side adhesive tape, a heat-sensitive paper tape, a double-sided adhesive tape, a film tape, and a tubular tape. In the following description, these tapes will be collectively referred to as a "tape". The printing device 1 is configured to perform a printing operation for printing characters such as letters and marks on the tape.

Figure 2:
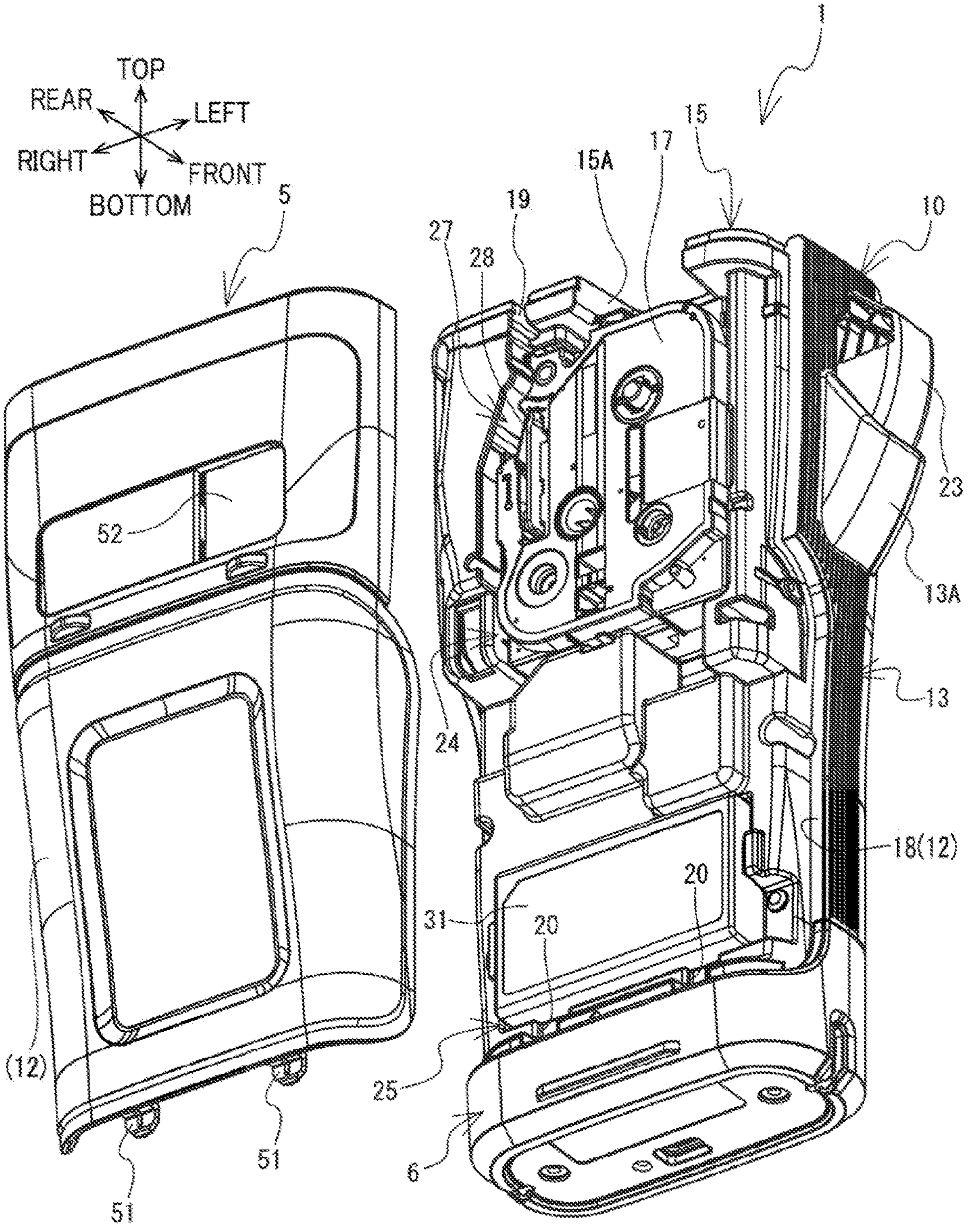
FIG. 2 is a rear perspective view of the printing device 1 in a state where a detachable cover 5 is opened.

As illustrated in FIGS. 1 and 2, the printing device 1 includes a housing 10, a display portion 21, the input portion 22, an operation lever 23, and a bottom cover 6.

The housing 10 has a box-like shape elongated in a top-bottom direction. The housing 10 has a front wall 11, a rear wall 12 (including a detachable cover 5 which will be described later in detail), a left wall 13, a right wall 14, a top wall 15, and a bottom wall 16 (see FIG. 3). The front wall 11 has a front surface which is to be observed by a user when the user operates the printing device 1. The display portion 21 is, for example, a liquid crystal display configured to display various information thereon. The display portion 21 is arranged in an upper portion on the front surface of the front wall 11. The input portion 22 is configured to be operated by the user for inputting various information. The input portion 22 is positioned below the display portion 21 on the front surface of the front wall 11.

The housing 10 includes a bulged part 13A protruding leftward from an upper portion of the left wall 13. The bulged part 13A has a bag-like configuration that is open upward (hereinafter, the opening of the bulged part 13A will be referred to as an aperture 131A). The bulged part 13A is configured to cover a lower region of the operation lever 23 (a lower region of an exposed portion of the operation lever 23, the exposed portion being positioned outside of the housing 10 and being not covered by the housing 10). The operation lever 23 is pivotally movably supported inside the housing 10 such that the exposed portion of the operation lever 23 is movable into and out of the housing 10 through the open end of the bulged part 13A in response to user's operations.

The rear wall 12 of the housing 10 is formed with an opening 18. The opening 18 is in communication with a cassette receiving portion 24 and a battery receiving portion 25. The cassette receiving portion 24 is configured to detachably receive the tape cassette 17 and is positioned in an upper portion inside the housing 10. The battery receiving portion 25 is configured to detachably receive a battery 31. Inside the housing 10, the battery receiving portion 25 is positioned below the cassette receiving portion 24. The cassette receiving portion 24 and the battery receiving portion 25 have a recessed shape that is open rearward inside the housing 10, and are exposed to the outside of the housing 10 through the opening 18. The tape cassette 17 and the battery 31 are attachable to and detachable from the cassette receiving portion 24 and the battery receiving portion 25, respectively, through the opening 18 from the rear side of the housing 10 in a front-rear direction. As will be described later, the opening 18 can be covered by the detachable cover 5.

Figure 3:
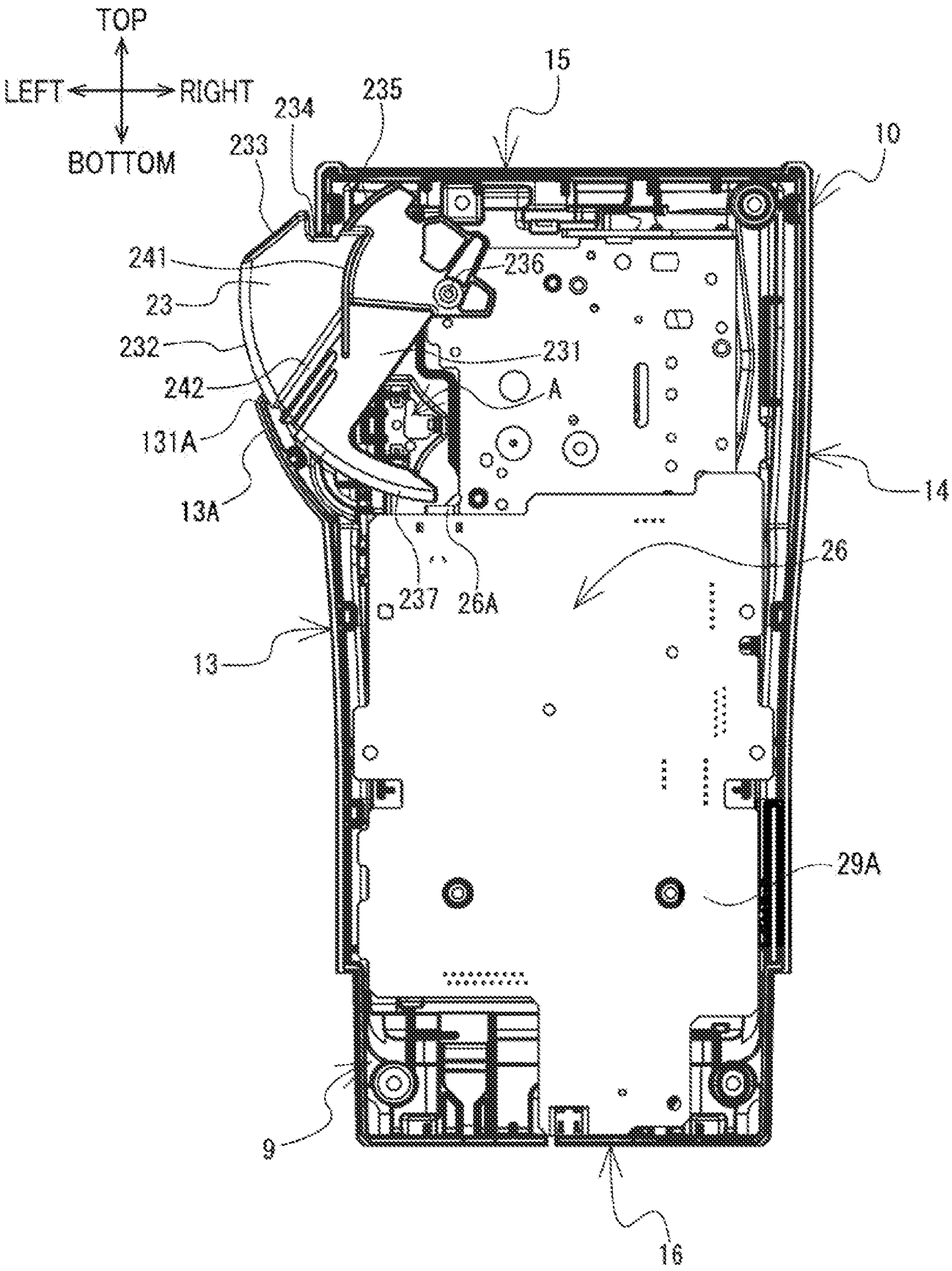
FIG. 3 is a front view of a structure inside a housing 10 of the printing device 1.

Inside the housing 10, a printing unit 27 and a controller 26 are accommodated. The printing unit 27 is positioned adjacent to the cassette receiving portion 24. The printing unit 27 includes a printing head 28, and other non-illustrated elements such as a platen roller, a drive motor, and a cutter mechanism. In the printing unit 27, printing is configured to be performed by the printing head 28 on the tape that has been paid out from the tape cassette 17 and that is being conveyed by rotation of the platen roller in response to rotation of the drive motor. As illustrated in FIG. 3, the controller 26 is positioned frontward of the cassette receiving portion 24 and the battery receiving portion 25, and extends toward the bottom from a generally center in the top-bottom direction inside the housing 10. The controller 26 includes a circuit board 29A, and other elements such as a CPU, a ROM, a RAM, and a power supply circuit (not illustrated) mounted on the circuit board 29A. The controller 26 is configured to control overall operations in the printing device 1.

The top wall 15 of the housing 10 has a tape discharge outlet 19 that penetrates through the top wall 15 in the top-bottom direction. The cutter mechanism of the printing unit 27 is positioned below the tape discharge outlet 19. The cutter mechanism includes a movable blade and a fixed blade (not illustrated). The operation lever 23 is provided at a left-upper end portion of the housing 10. The operation lever 23 is configured to be depressed diagonally rightward and downward into the interior of the housing 10 to actuate the movable blade for cutting the printed tape. The printed tape cut by the cutter mechanism is configured to be discharged to the outside of the housing 10 through the tape discharge outlet 19.

The operation lever 23 will be described in detail.

Figure 4:
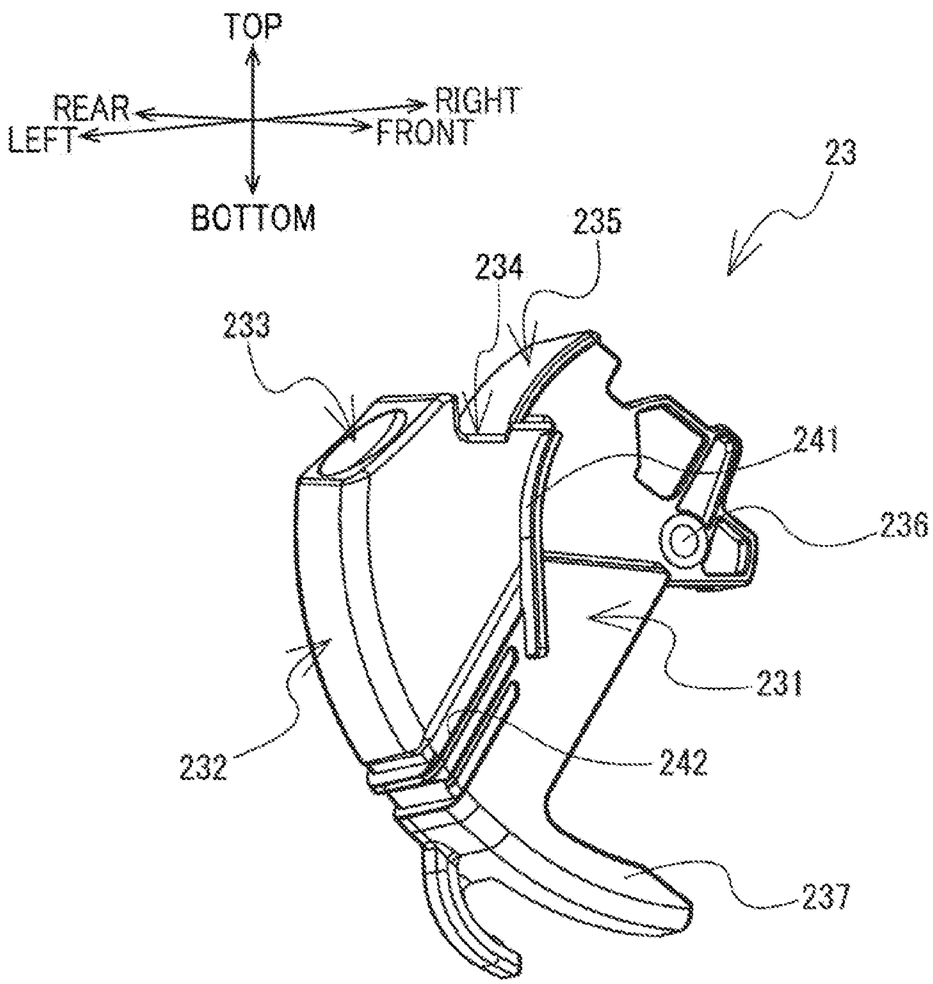
FIG. 4 is a perspective view of an operation lever 23 of the printing device 1.

As illustrated in FIGS. 3 and 4, the operation lever 23 has a pair of side surfaces 231, a back surface 232, an operation surface 233, a restricting surface 234, a suppression surface 235, a shaft hole 236, an acting part 237, a guide rib 241, and a guide groove 242. Incidentally, directions with respect to the operation lever 23 illustrated in FIG. 4 are coincident with those directions with respect to the housing 10 depicted in FIG. 3 where no operation is performed on the operation lever 23.

The operation lever 23 has a plate-shape having a thickness in the front-rear direction. The pair of side surfaces 231 of the operation lever 23 is positioned opposite each other in the front-rear direction. The operation lever 23 also has an outer peripheral surface connecting the pair of side surfaces 231 to each other. The shaft hole 236 is positioned in a right end portion of the operation lever 23. A shaft (not illustrated) extending in the front-rear direction is inserted in the shaft hole 236. The non-illustrated shaft is positioned at an upper left end portion of the housing 10 and pivotally movably supports the operation lever 23. That is, the operation lever 23 is pivotally movable about the shaft.

The operation lever 23 is urged in a clockwise direction in FIG. 3 by a spring (not illustrated). Each side surface 231 has a left end having an arcuate shape whose radial center is coincident with a center axis of the shaft hole 236. The back surface 232 is an outer peripheral surface connecting the arcuate left ends of the respective side surfaces 231 in the front-rear direction and curved into the arcuate shape. The back surface 232 is positioned adjacent to a lower edge defining the aperture 131A of the bulged part 13A, and is configured to maintain a constant gap from the lower edge of the aperture 131A of the bulged part 13A during pivotal movement of the operation lever 23.

The back surface 232 has an upper end connected to the operation surface 233. The operation surface 233 extends diagonally upward and rightward. The operation surface 233 is configured to be depressed by the user to push the operation lever 23 into the housing 10. The restricting surface 234 is positioned on the right side of the operation surface 233. The restricting surface 234 faces upward and is configured to abut on an upper edge defining the aperture 131A of the bulged part 13A by the urging force of the non-illustrated spring while the operation lever 23 is not operated.

The restricting surface 234 has a right end from which the suppression surface 235 extends. The suppression surface 235 extends diagonally upward and rightward while making a curve. The suppression surface 235 is positioned inside the housing 10 while the operation lever 23 is not operated. The suppression surface 235 is positioned in the aperture 131A of the bulged part 13A and is exposed to the outside of the housing 10 through the aperture 131A while the operation lever 23 is depressed by the user, in order to suppress entry of liquid into the housing 10 through the aperture 131A.

The acting part 237 constitutes a lower end portion of the operation lever 23. The acting part 237 extends diagonally downward and rightward from the side surfaces 231. The acting part 237 extends arcuately and is continuous with the arcuate shape of the back surface 232. The acting part 237 is configured to actuate a microswitch 26A provided on the controller 26 in response to user's depression of the operation lever 23. The controller 26 is configured to control conveyance of the tape in timed relation to the tape cutting operation by the cutter mechanism based on signals transmitted from the microswitch 26A.

The guide rib 241 and the guide groove 242 are provided on each side surface 231 of the operation lever 23. The guide rib 241 is positioned at a generally center on each side surface 231 and protrudes outward therefrom in the front-rear direction. The guide rib 241 extends in the top-bottom direction along each side surface 231. The guide rib 241 has an upper end portion which gently curves toward the right to have an upper end that is positioned adjacent to the suppression surface 235. The guide rib 241 has a lower end that is positioned on the right side of the lower edge defining the aperture 131A of the bulged part 13A while the operation lever 23 is not operated. The guide rib 241 is configured to close the aperture 131A of the bulged part 13A from the inside thereof. The guide rib 241 functions as a flow-resistant member against liquid that flows into the housing 10 along the side surfaces 231.

The guide groove 242 is formed in each side surface 231, and extends between the guide rib 241 and the back surface 232 on each side surface 231. The guide groove 242 has a rightmost end connected to a left side surface of a lower end portion of the guide rib 241. The guide groove 242 has a leftmost end connected to a groove formed in the back surface 232. The same is true with respect to the other guide groove 242 formed in the other side surface 231. Hence, the guide grooves 242, 242 are in communication with each other through the groove on the back surface 232. The guide groove 242 on each side surface 231 is arranged to extend along the periphery of the aperture 131A of the bulged part 13A within the aperture 131A while the operation lever 23 is not operated.

Liquid flowing along the side surfaces 231 toward the inside of the housing 10 is to flow into the guide grooves 242 within the aperture 131A of the bulged part 13A. The liquid then flows along the guide grooves 242 and is guided to an inner surface of the left wall 13. The liquid then flows downward along the inner surface of the left wall 13, and is discharged to the outside of the housing 10 through a bottom end portion 9 of the housing 10. How the liquid is to be discharged through the bottom end portion 9 will be described later in greater detail.

Inside the housing 10, an electrically-driven portion A is provided at a position adjacent to the operation lever 23. The electrically-driven portion A is configured to be activated upon receipt of power when the printing device 1 is used. The guide rib 241 and the guide groove 242 are designed to guide the liquid that flows along the side surfaces 231 into the interior of the housing 10 through the aperture 131A, such that the liquid can flow along prescribed routes to be discharged to the outside of the housing 10 while keeping away from the electrically-driven portion A.

Figure 5A:
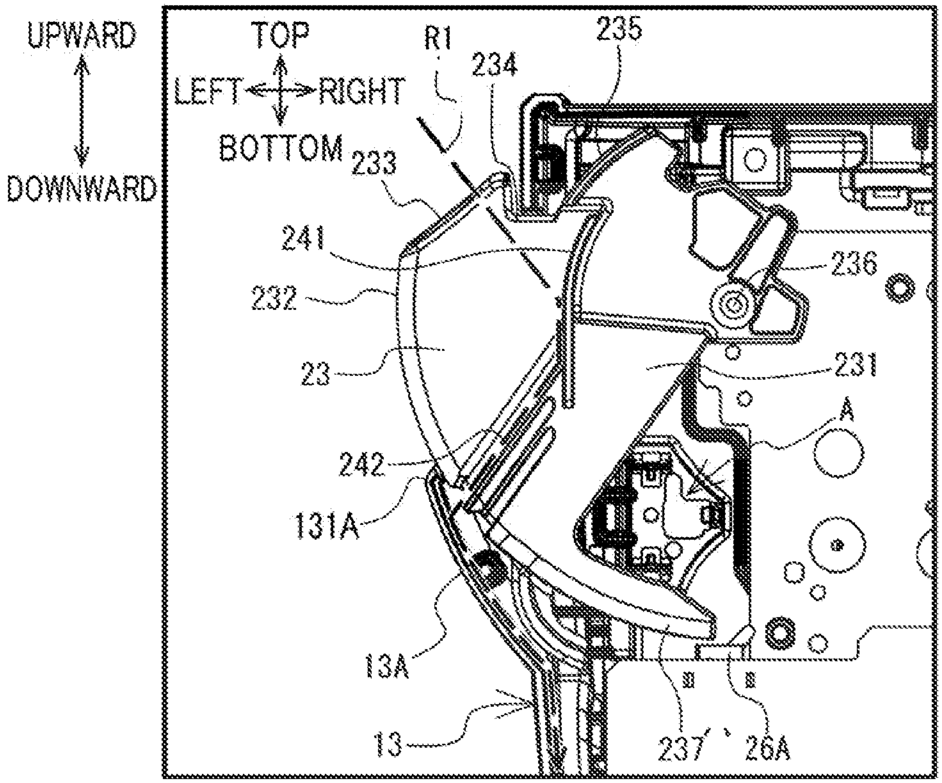
FIG. 5A is a view for description of a discharge route R1 of liquid that flows into the housing 10 along the operation lever 23 in a state where the printing device 1 is held such that a top wall 15 of the housing 10 faces upward while the operation lever 23 is not depressed.

Specifically, referring to FIG. 5A, in a case where the liquid falls on the operation lever 23 that is not operated while the printing device 1 is used in such a posture that the top wall 15 of the housing 10 faces upward (normal posture), the liquid flows along a discharge route R1 which is indicated by a broken line. That is, the liquid falling on the operation lever 23 is designed to flow along the side surface 231 and then enter inside the housing 10 through the aperture 131A of the bulged part 13A as follows. The liquid flowing along the side surface 231 first reaches the guide rib 241, and then flows downward along the left side surface of the guide rib 241. The liquid then flows into the guide groove 242 connected to the guide rib 241, and flows diagonally downward and leftward along the guide groove 242 to reach the back surface 232. The liquid then falls downward onto an inner surface of the bulged part 13A, and then flows downward along the inner surface of the bulged part 13A. The liquid then flows further downward along the inner surface of the left wall 13 toward the bottom end portion 9 of the housing 10. The liquid is then discharged to the outside of the housing 10 through a liquid discharging system provided in the bottom end portion 9. Details of the liquid discharging system will be described later.

In this way, even in a case where liquid flows into the bulged part 13A while the operation lever 23 is not operated, the guide rib 241 and the guide groove 242 can control the liquid to flow along the inner surface of the housing 10 to reach the bottom end portion 9 (along the discharge route R1) while preventing the liquid from reaching the electrically-driven portion A.

Figure 5B:
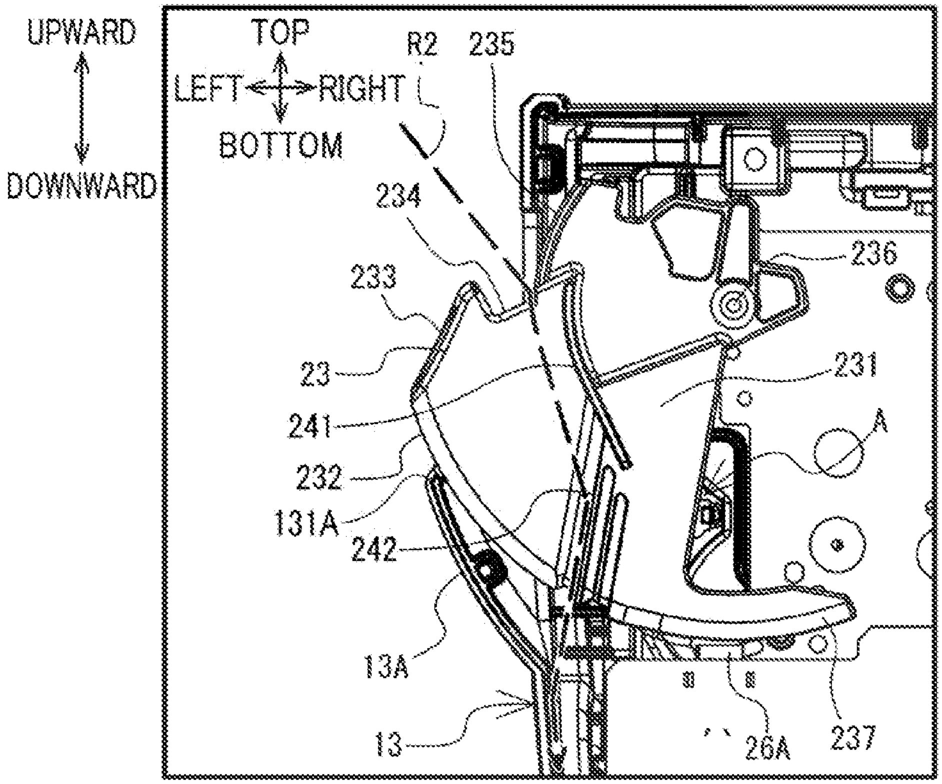
FIG. 5B is a view for description of a discharge route R2 of liquid that flows into the housing 10 along the operation lever 23 in a state where the printing device 1 is held such that the top wall 15 of the housing 10 faces upward while the operation lever 23 is depressed.

Further, referring to FIG. 5B, in a case where liquid falls on the operation lever 23 while the operation lever 23 is depressed, the liquid flows along a discharge route R2 indicated by a broken line. Specifically, the liquid falls along the side surface 231 and then flows into the housing 10 through the aperture 131A of the bulged part 13A as follows. The liquid flowing along the side surface 231 flows into the guide groove 242. The liquid flows downward along the guide groove 242, and then along the inner surface of the left wall 13 of the housing 10, and reaches the bottom end portion 9 of the housing 10.

In this way, even in a case where the liquid enters the bulged part 13A while the operation lever 23 is depressed, the guide rib 241 and the guide groove 242 can control the liquid to flow along the discharge route R2, thereby enabling the liquid to flow downward along the inner surface of the housing 10 to reach the bottom end portion 9 of the housing 10 while preventing the liquid from reaching the electrically-driven portion A.

Figure 6:
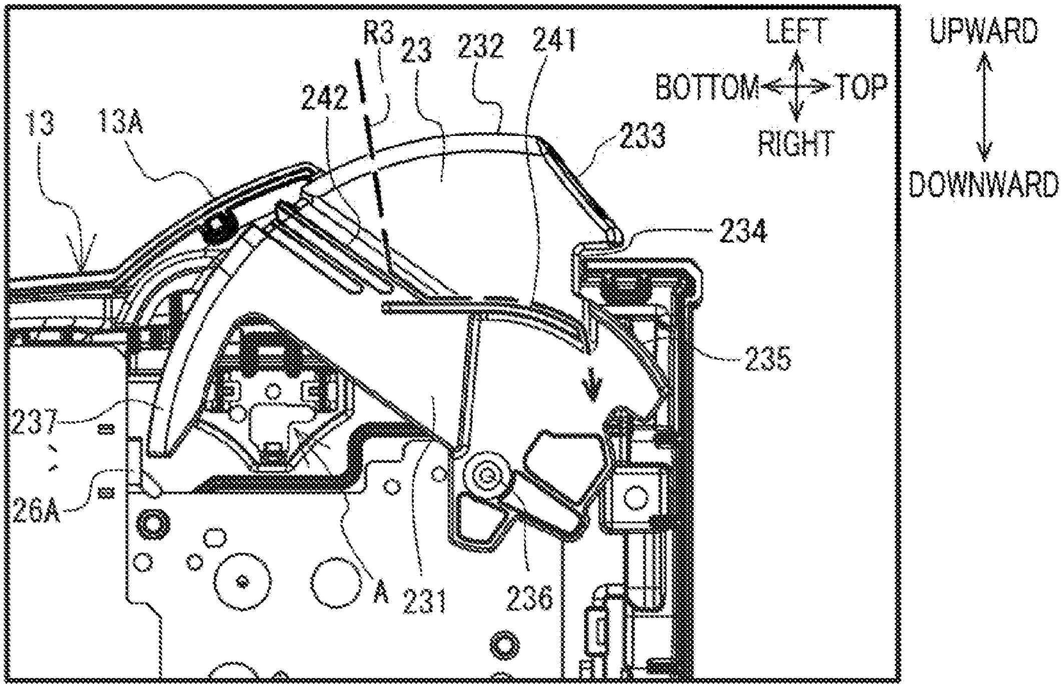
FIG. 6 is a view for description of a discharge route R3 of liquid that flows into the housing 10 along the operation lever 23 in a case where the printing device 1 is held such that a left wall 13 of the housing 10 faces upward.

Still further, referring to FIG. 6, in a case where liquid falls on the operation lever 23 while the printing device 1 is used in such a posture that the left wall 13 faces upward, the liquid flows along a discharge route R3 indicated by a broken line. Specifically, the liquid flows along the side surface 231 and enters the housing 10 through the aperture 131A of the bulged part 13A as follows. The liquid flowing along the side surface 231 reaches the guide rib 241, directly or via the guide groove 242. The liquid flows along the left surface of the guide rib 241 (rightward in FIG. 6) and falls down from the top end (rightmost end in FIG. 6) of the guide rib 241 onto the inner surface of the housing 10. The liquid then flows along the inner surface of the housing 10 (and an inner surface of the detachable cover 5) and reaches the bottom end portion 9 of the housing 10.

In this way, even in a case where liquid enters the bulged part 13A while the printing device 1 is held such that the aperture 131A of the bulged part 13A faces upward, the guide rib 241 and the guide groove 242 can control the liquid to flow along the discharge route R3, thereby preventing the liquid from reaching the electrically-driven portion A.

Next, the detachable cover 5 will be described in detail.

Figure 7:
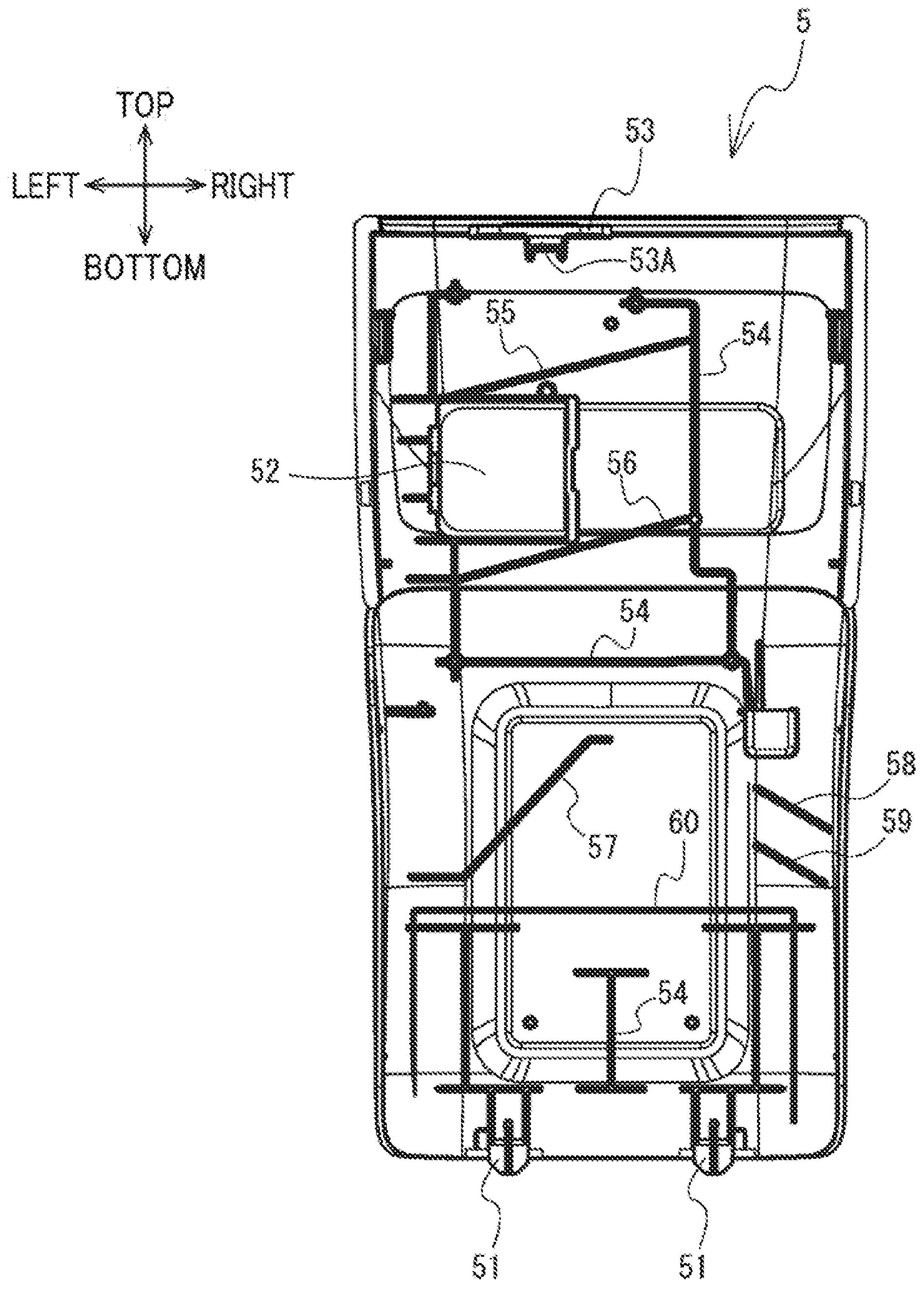
FIG. 7 is a front view of the detachable cover 5.

As illustrated in FIGS. 2 and 7, the detachable cover 5 is configured to be fitted in the opening 18 of the rear wall 12 of the housing 10 to expose and close the cassette receiving portion 24 and the battery receiving portion 25. Incidentally, directions with respect to the detachable cover 5 illustrated in FIG. 7 will be consistent with those with respect to the housing 10 in which the detachable cover 5 is fitted in the opening 18 of the housing 10.

The detachable cover 5 has a plate-like shape elongated in the top-bottom direction. The detachable cover 5 has a thickness in the front-rear direction. The rear wall 12 of the housing 10 is almost entirely opened to provide the opening 18 except the bottom end portion 9. The detachable cover 5 constitutes a part of the rear wall 12 of the housing 10 in a state where the detachable cover 5 closes the opening 18.

On a bottom end portion of the detachable cover 5, a pair of protrusions 51 is provided. Specifically, the pair of protrusions 51 is provided on an inner surface of the bottom end portion of the detachable cover 5. The protrusions 51 are positioned apart from each other in a left-right direction, and protrude downward from the bottom end portion of the detachable cover 5. On the other hand, a pair of insertion holes 20 (see FIG. 2) is formed in a bottom region of a periphery defining the opening 18 in the rear wall 12 of the housing 10. The pair of insertion holes 20 is positioned apart from each other in the left-right direction, and is recessed downward on the bottom region of the periphery of the opening 18.

In a state where the detachable cover 5 is attached to the housing 10, the protrusions 51 are inserted in the respective insertion holes 20 and the bottom end portion of the detachable cover 5 is in abutment with the bottom periphery of the opening 18 to restrict disengagement of the bottom end portion of the detachable cover 5 from the opening 18 of the housing 10.

On a top end portion of the detachable cover 5, a fixing part 53 is provided. The fixing part 53 functions to fix the detachable cover 5 relative to the housing 10 when the detachable cover 5 closes the opening 18. The fixing part 53 has a plate-like configuration extending in the front-rear direction. The fixing part 53 has a front end provided with a hook 53A protruding frontward therefrom.

On the other hand, the top wall 15 of the housing 10 has a notched part 15A (see FIG. 2) for receiving the fixing part 53. The notched part 15A has a rectangular shape and is recessed rearward. Further, the top wall 15 has a lower surface provided with an engagement part (not illustrated). When the detachable cover 5 closes the opening 18, the fixing part 53 is received in the notched part 15A and the hook 53A is engaged with the engagement part to fix the fixing part 53 to the top wall 15.

For detachment of the detachable cover 5 from the housing 10, the user pushes the fixing part 53 downward relative to the top wall 15, thereby disengaging the hook 53A from the engagement part of the top wall 15. The user then pivotally moves the top end of the detachable cover 5 rearward about the pair of protrusions 51 as a fulcrum, by which the detachable cover 5 can be detached from the housing 10 to expose the opening 18.

A window 52 is formed in an upper-left end portion of the detachable cover 5. The window 52 is formed at a position aligned with the position of the cassette receiving portion 24 in the state where the detachable cover 5 closes the opening 18. A transparent resin plate is fitted with the window 52, so that the user can visually confirm whether the tape cassette 17 is attached to the cassette receiving portion 24 through the window 52.

A plurality of reinforcing ribs 54 and a plurality of protection ribs 55-60 are formed on an inner surface (front surface) of the detachable cover 5 to protrude frontward therefrom.

Some of the reinforcing ribs 54 extend in the top-bottom direction and the other reinforcing ribs 54 extend in the left-right direction. That is, the reinforcing ribs 54 extend to cross one another for reinforcing mechanical strength of the detachable cover 5.

The protection ribs 55-59 extend diagonally downward and toward either a left or right end of the detachable cover 5 from a generally center region in the left-right direction on the inner surface of the detachable cover 5.

Specifically, the protection rib 55 is positioned above the window 52 and extends diagonally downward toward the left end of the detachable cover 5 from a position offset rightward from the left-right center of the detachable cover 5. The protection rib 56 is positioned below the window 52 and extends diagonally downward toward the left end of the detachable cover 5 from a position offset rightward from the left-right center of the detachable cover 5.

The protection rib 57 extends diagonally downward toward the left end of the detachable cover 5 from a position generally center in the left-right direction and in the top-bottom direction of the detachable cover 5. The protection ribs 58 and 59 are positioned on the right side of the protection rib 57 and are arrayed with each other in the top-bottom direction. The protection ribs 58 and 59 extend diagonally downward toward the right end of the detachable cover 5 from a region offset rightward from the left-right center of the detachable cover 5.

The protection rib 60 is arranged at such a position that the protection rib 60 surrounds the battery receiving portion 25 when the detachable cover 5 is attached to the housing 10. More specifically, the protection rib 60 has three parts: a first part positioned above the battery receiving portion 25 and extending in the left-right direction; a second part positioned on the left side of the battery receiving portion 25 and extending downward from a left end of the first part; and a third part positioned on the right side of the battery receiving portion 25 and extending downward from a right end of the first part. Each of the protection ribs 55-60 has a protruding length greater than a protruding length of each of the reinforcing ribs 54.

Liquid entering the housing 10 flows downward along the inner surface of the detachable cover 5. When the liquid reaches the bottom periphery of the opening 18, the liquid is discharged to the outside of the housing 10 through a gap between the bottom end of the detachable cover 5 and the bottom periphery of the opening 18. The liquid flowing along the inner surface of the detachable cover 5 is intercepted by one of the reinforcing ribs 54 extending in the left-right direction, and the liquid then flows rightward or leftward along the reinforcing rib 54. As the liquid reaches either left or right end of the reinforcing rib 54, the liquid then flows downward at positions adjacent to the left or right end of the detachable cover 5.

As an amount of liquid flowing onto the reinforcing ribs 54 increases, the liquid may move over the reinforcing ribs 54, flow downward from the reinforcing ribs 54, and then flow into the bottom end portion 9 through the protrusions 51 and the insertion holes 20. However, according to the detachable cover 5 of the present embodiment, the protection ribs 55-60 (whose protruding length from the inner surface of the detachable cover 5 is greater than that of the reinforcing ribs 54) can securely dam the liquid flowing along the inner surface of the detachable cover 5 and guide the liquid toward the left and right ends of the detachable cover 5. The protection ribs 55-60 can suppress the liquid from flowing into the insertion holes 20 via the protrusions 51.

Further, the protection rib 60 also dams the liquid at the positions upward, rightward and leftward of the battery receiving portion 25 to prevent the liquid from flowing into a region where the battery receiving portion 25 is positioned, and guides the liquid toward the left and right ends of the detachable cover 5.

Still further, even in a case where liquid enters the housing 10 through the tape discharge outlet 19 and the liquid flows downward along the inner surface of the detachable cover 5, the protection ribs 55-60 guide the liquid toward the left and right ends of the detachable cover 5, thereby preventing the liquid from flowing into the insertion holes 20.

Incidentally, in the bottom end portion 9 of the housing 10, the liquid coming through the gap between the bottom end of the detachable cover 5 and the bottom periphery of the opening 18 is to be discharged to the outside of the bottom cover 6 through a pair of chambers 80 (described later, see FIG. 10) and a pair of drain channels 96 (described later, see FIG. 10).

Next, a structure provided at the bottom end portion 9 for discharging the liquid entered in the housing 10 to the outside of the printing device 1 will be described.

Figure 8:
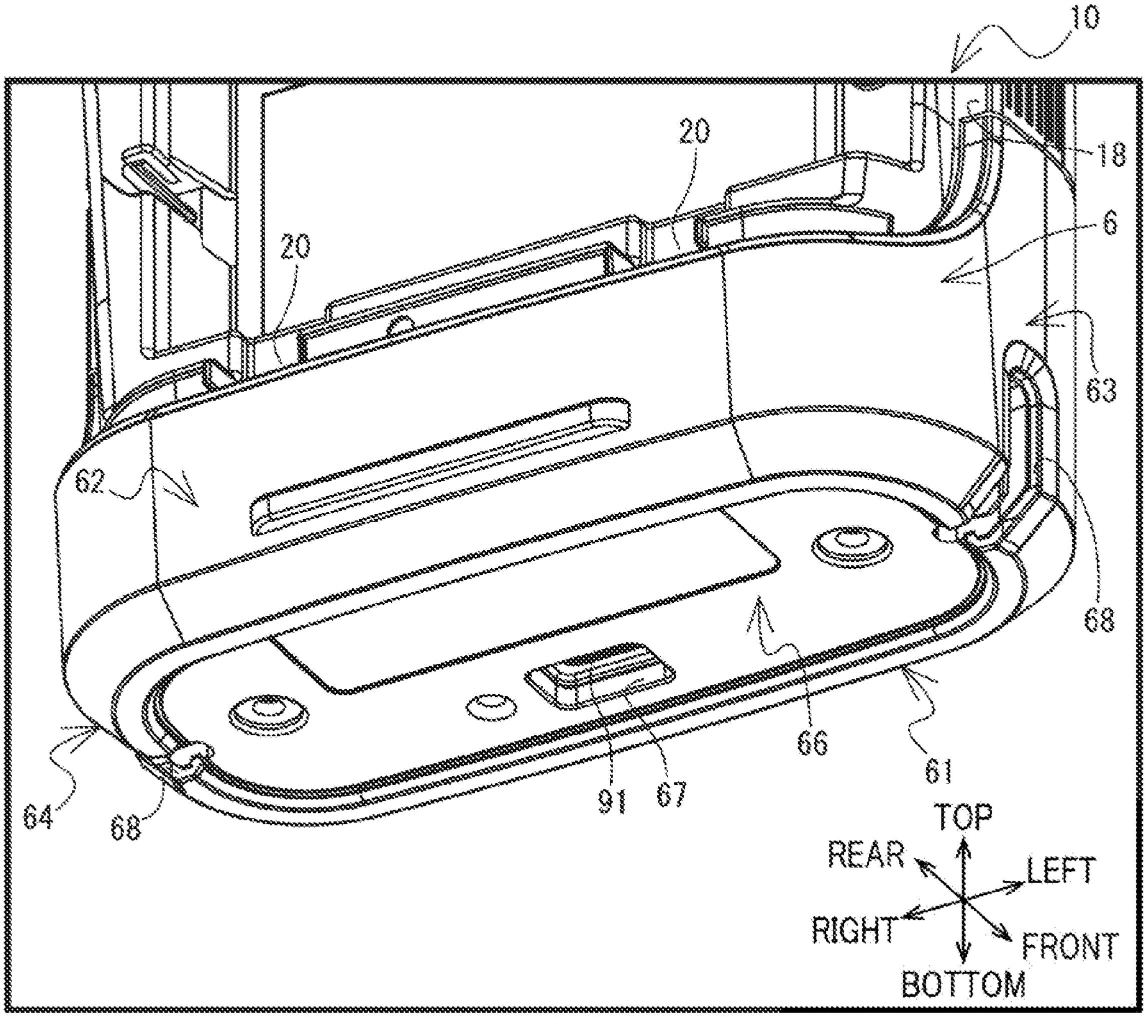
FIG. 8 is a perspective view of a bottom end portion 9 of the housing 10 with a bottom cover 6 assembled thereto.

As illustrated in FIG. 8, the bottom cover 6 is attached to the bottom end portion 9 of the housing 10. The bottom cover 6 includes a front wall 61, a rear wall 62, a left wall 63, a right wall 64, and a bottom wall 66. The bottom cover 6 is open upward. Upon attachment of the bottom cover 6 to the bottom end portion 9 of the housing 10, the bottom cover 6 partly covers the front wall 11, the rear wall 12, the left wall 13, the right wall 14, and the bottom wall 16 of the housing 10. The front wall 61, the rear wall 62, the left wall 63, the right wall 64, and the bottom wall 66 of the bottom cover 6 face the front wall 11, the rear wall 12, the left wall 13, the right wall 14, and the bottom wall 16 of the housing 10, respectively.

The bottom wall 66 of the bottom cover 6 has a through-hole 67 penetrating through the bottom wall 66 in the top-bottom direction. The through-hole 67 is formed at such a position corresponding to a position of a communication port 91 that is open at the bottom wall 16 of the housing 10. With this structure, a connector (not illustrated) of a communication cable (not illustrated) can be inserted in and detached from the communication port 91 through the through-hole 67.

On an inner surface of the bottom wall 66, a region adjacent to the through-hole 67 is raised up such that the raised inner surface is in intimate contact with a region around the communication port 91 at the bottom wall 16 of the housing 10. With this structure, even in a case where liquid splashes onto the bottom wall 66, the liquid is less likely to penetrate into a gap between the inner surface of the bottom cover 6 and the outer surface of the bottom end portion 9 of the housing 10 through the through-hole 67, whereas the liquid may flow into the communication port 91 through the through-hole 67.

The bottom cover 6 also has a pair of side openings 68. One of the side openings 68 is formed at a corner portion defined by the bottom wall 66 and the left wall 63, and the other side opening 68 is formed at a corner portion defined by the bottom wall 66 and the right wall 64. Upon attachment of the bottom cover 6 to the housing 10, the side openings 68 are respectively in communication with corresponding drain holes 95 of the housing 10 (see FIGS. 9A and 9B). The drain holes 95 are formed in pairs in the housing 10. One of the drain holes 95 is formed at a corner portion defined by the bottom wall 16 and the left wall 13 of the housing 10, and the other drain hole 95 is formed at a corner portion defined by the bottom wall 16 and the right wall 14 of the housing 10. The drain holes 95 of the housing 10 are exposed to the outside through the corresponding side openings 68 of the bottom cover 6. With this structure, the liquid that has entered the housing 10 is designed to be discharged to a gap between the housing 10 and the inner surface of the bottom cover 6 through the drain holes 95, and then to the outside of the printing device 1 through the side openings 68 in communication with the drain holes 95.

Figure 9A:
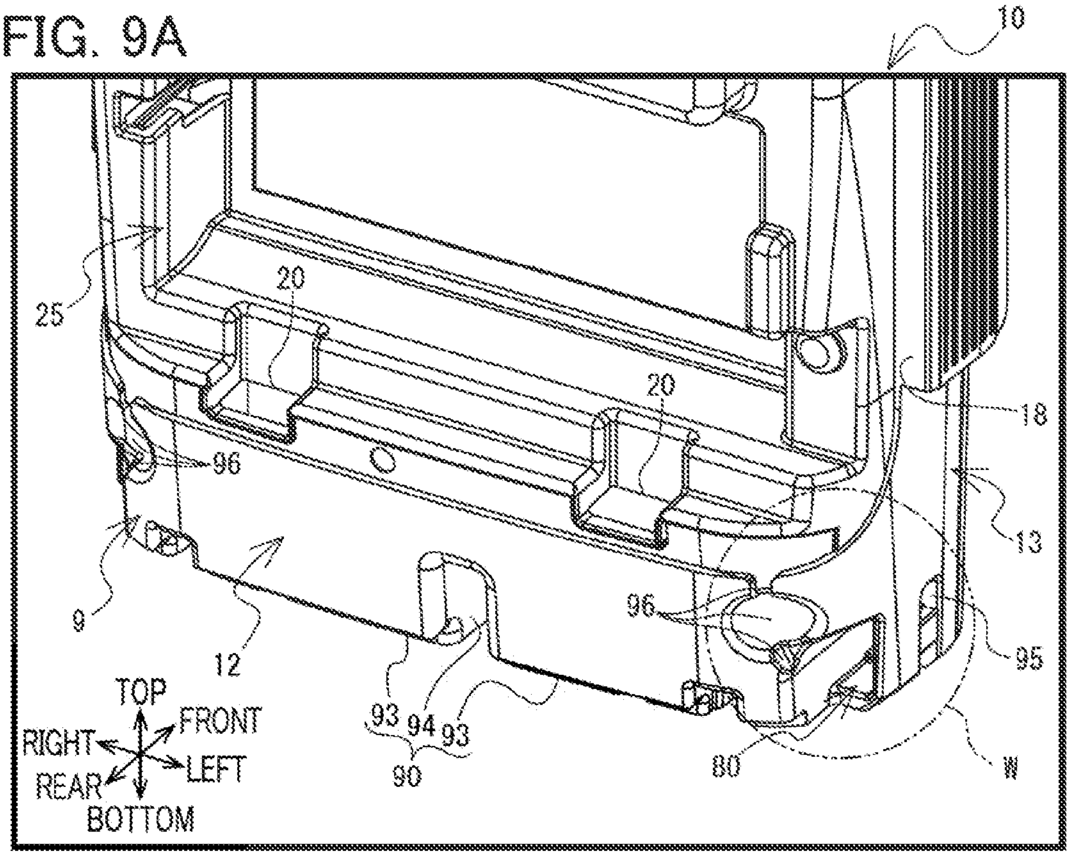
FIG. 9A is a perspective view of the bottom end portion 9 of the housing 10 without the bottom cover 6.
Figure 9B:
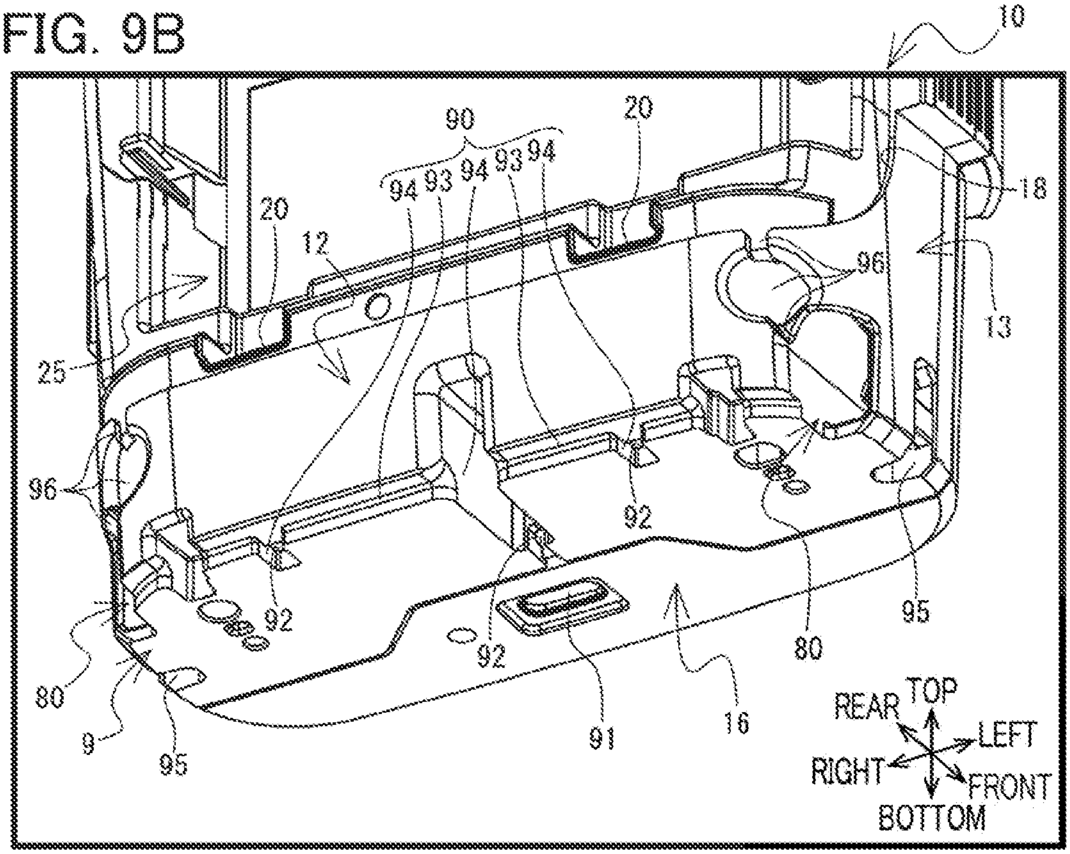
FIG. 9B is another perspective view of the bottom end portion 9 of the housing 10 without the bottom cover 6.

As illustrated in FIGS. 9A and 9B, the bottom end portion 9 of the housing 10 is formed with communication holes 92, the pair of chambers 80, a guide channel 90, and the drain holes 95. Each communication hole 92 is open at the bottom wall 16 of the housing 10 and provides communication between the inside and outside of the housing 10. Three communication holes 92 are formed on the bottom wall 16 so as to be spaced apart from one another in the left-right direction.

Each chamber 80 functions as a liquid reservoir for temporarily storing the liquid discharged through the communication holes 92 before discharging the liquid through the drain holes 95. One of the chambers 80 is formed in the left wall 13 of the bottom end portion 9, and the other one of the chambers 80 is formed in the right wall 14 of the bottom end portion 9. A detailed structure of the chamber 80 will be described later.

The guide channel 90 is in communication with the communication holes 92 and the respective chambers 80. The guide channel 90 includes a circumferential channel 93 and three connection channels 94.

The circumferential channel 93 is in a form of a groove extending in the left-right direction along a corner portion defined by the rear wall 12 and the bottom wall 16. The circumferential channel 93 is open toward the rear, and the open end of the circumferential channel 93 is closed by the inner surface of the bottom cover 6 upon attachment of the bottom cover 6 to the housing 10, thereby serving as a channel to allow liquid flow therethrough. The circumferential channel 93 has a left end fluidly connected to the chamber 80 formed in the left wall 13, and has a right end fluidly connected to the chamber 80 formed in the right wall 14. The circumferential channel 93 is configured to guide the liquid in a circumferential direction of the housing 10.

The connection channels 94 are in communication with the respective communication holes 92 and are connected to the circumferential channel 93. The three connection channels 94 are arranged at such positions corresponding to the positions of the respective three communication holes 92. The connection channels 94 are formed in the bottom wall 16 and have a recessed shape. Each connection channel 94 extends in the front-rear direction from the corresponding communication hole 92 and is connected to the circumferential channel 93. The open end of each connection channel 94 is closed by the inner surface of the bottom cover 6 upon attachment of the bottom cover 6 to the housing 10, thereby serving as a channel to allow liquid flow therethrough.

Figure 10:
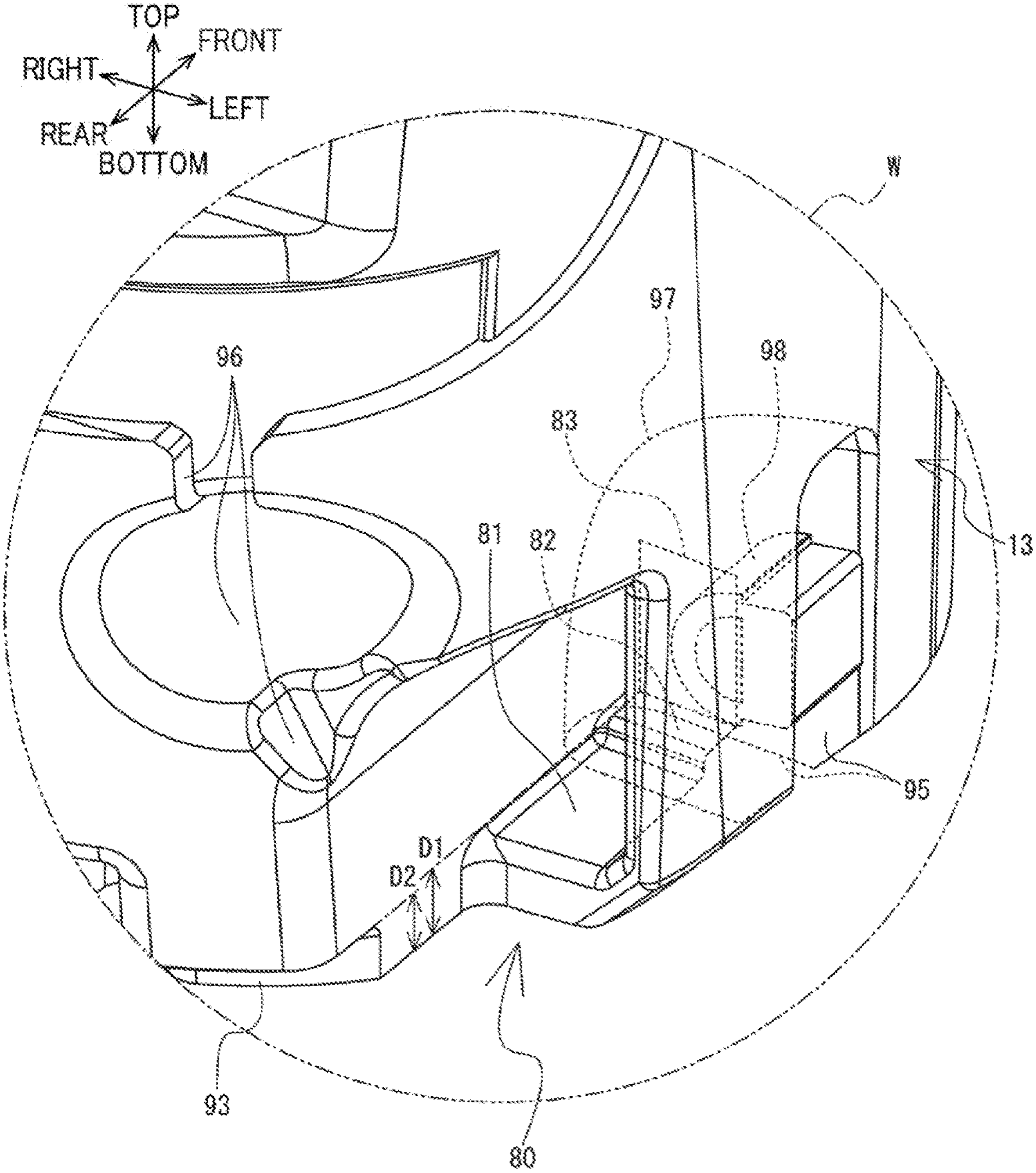
FIG. 10 is an enlarged view of a portion W encircled by a two-dotted chain line in FIG. 9A.

As illustrated in FIG. 10, a pair of recesses 75 is formed in the bottom end portion 9 of the housing 10, one in a corner portion between the left wall 13 and the bottom wall 16, and the other in a corner portion between the right wall 14 and the bottom wall 16. Specifically, one of the recesses 97 on the left is open on the left wall 13 and the bottom wall 16 to provide the drain hole 95 on the left side, and the other recess 97 on the right is open on the right wall 14 and the bottom wall 16 to provide the drain hole 95 on the right side. That is, each drain hole 95 is open on the bottom wall 16 and either one of the left wall 13 and the right wall 14. Each recess 97 is recessed inward to provide a curved inner peripheral surface.

An attachment mount part 98 is provided inside the recess 97 on the left. The attachment mount part 98 is used for attachment of an accessory tool such as a strap (not illustrated) to the housing 10, so that the user can hold the printing device 1 with his one hand. The attachment mount part 98 has a rod-like shape extending rearward from a front region on the inner peripheral surface of the recess 97 on the left wall 13. The attachment mount part 98 protrudes rearward to have a protruding end (free end) that is not supported by the inner peripheral surface of the recess 97. A loop of the strap is engageable with the attachment mount part 98, so that the strap can be attached to the housing 10 on the inside of the recess 97. An opening 83 is open on a rear region of the inner peripheral surface of each recess 97. Each recess 97 is in communication with the corresponding chamber 80 through the opening 83.

The chambers 80 are notched regions that are recessed from an outer surface of the bottom end portion 9, one in the corner portion between the bottom wall 16 and the left wall 13, and the other one in the corner portion between the bottom wall 16 and the right wall 14. Each chamber 80 is recessed frontward from the outer surface (rear surface) of the rear wall 12. Each chamber 80 has a bottom end portion with a stepped configuration. Specifically, the bottom end portion of each chamber 80 is configured of a first bottom part 81, and a second bottom part 82 positioned frontward of the first bottom part 81.

The second bottom part 82 has a top surface that is positioned higher than a top surface of the first bottom part 81. That is, the top surface of the second bottom part 82 provides a height D1 from the bottom surface of the bottom wall 16 that is higher than a height defined by the top surface of the first bottom part 81 from the bottom surface of the bottom wall 16. The second bottom part 82 is connected to the opening 83 of the recess 97. That is, the top surface of the second bottom part 82 is connected to a bottom edge of the opening 83.

The chamber 80 has a rear end region fluidly connected to the circumferential channel 93 formed in the bottom end portion 9 of the housing 10. The circumferential channel 93 defines a height D2 from the bottom surface of the bottom wall 16. The height D1 defined by the top surface of the second bottom part 82 is higher than the height D2 defined by the circumferential channel 93. That is, a vertical position of the bottom edge of the opening 83 through which the chamber 80 is connected to the recess 97 (height D1) is higher than a vertical position of the circumferential channel 93 (height D2).

With this structure, the liquid flowing into each chamber 80 through the circumferential channel 93 is designed to be stored in each chamber 80 temporarily. As the amount of the liquid stored in each chamber 80 increases and the level of the liquid in the chamber 80 exceeds the height D1 of the top surface of the corresponding second bottom part 82, the liquid flows into the corresponding recess 97 through the opening 83 and is finally discharged to the outside of the housing 10 through the corresponding drain hole 95.

Further, each recess 97 has an upper end (top inner peripheral surface) that is positioned higher than a boundary region between the circumferential channel 93 and the corresponding chamber 80. This means that, in a case where the printing device 1 is held upside down, the upper end of the recess 97 (i.e., an upper end of the drain hole 95) is positioned lower than the boundary region. Hence, in this case where the printing device 1 is held upside down, the liquid flowing into the chamber 80 through the circumferential channel 93 flows into the upper end of the recess 97 (i.e., which now constitutes a lower region within the recess 97) through the opening 83, and is finally discharged to the outside through the corresponding drain hole 95.

The pair of drain channels 96 is formed one each in left and right end regions on the rear surface of the rear wall 12 in the bottom end portion 9. Each drain channel 96 is in a form of a groove that is recessed frontward from the rear surface of the rear wall 12. Each drain channel 96 extends in the top-bottom direction and has a bottom end that is in communication with the corresponding chamber 80. A connection point between the bottom end of the drain channel 96 and the corresponding chamber 80 is positioned above the boundary region between the circumferential channel 93 and the same chamber 80.

Each drain channel 96 has a top end that is exposed to the outside. That is, the top end of each drain channel 96 is positioned higher than a top edge of the bottom cover 6 attached to the bottom end portion 9. Further, the drain channels 96 are both positioned outward of the insertion holes 20 (in which the protrusions 51 of the detachable cover 5 are received) in the left-right direction. In other words, the drain channel 96 on the left is positioned closer to the left wall 13 than the left insertion hole 20 is to the left wall 13 in the left-right direction, and the drain channel 96 on the right is positioned closer to the right wall 14 than the insertion hole 20 on the right is to the right wall 14 in the left-right direction.

The liquid having entered the housing 10 is controlled to flow along the inner surface of the housing 10 to take downward roundabout discharge routes to reach the bottom end portion 9 while avoiding flowing into the electrically-driven portion A.

Figure 11:
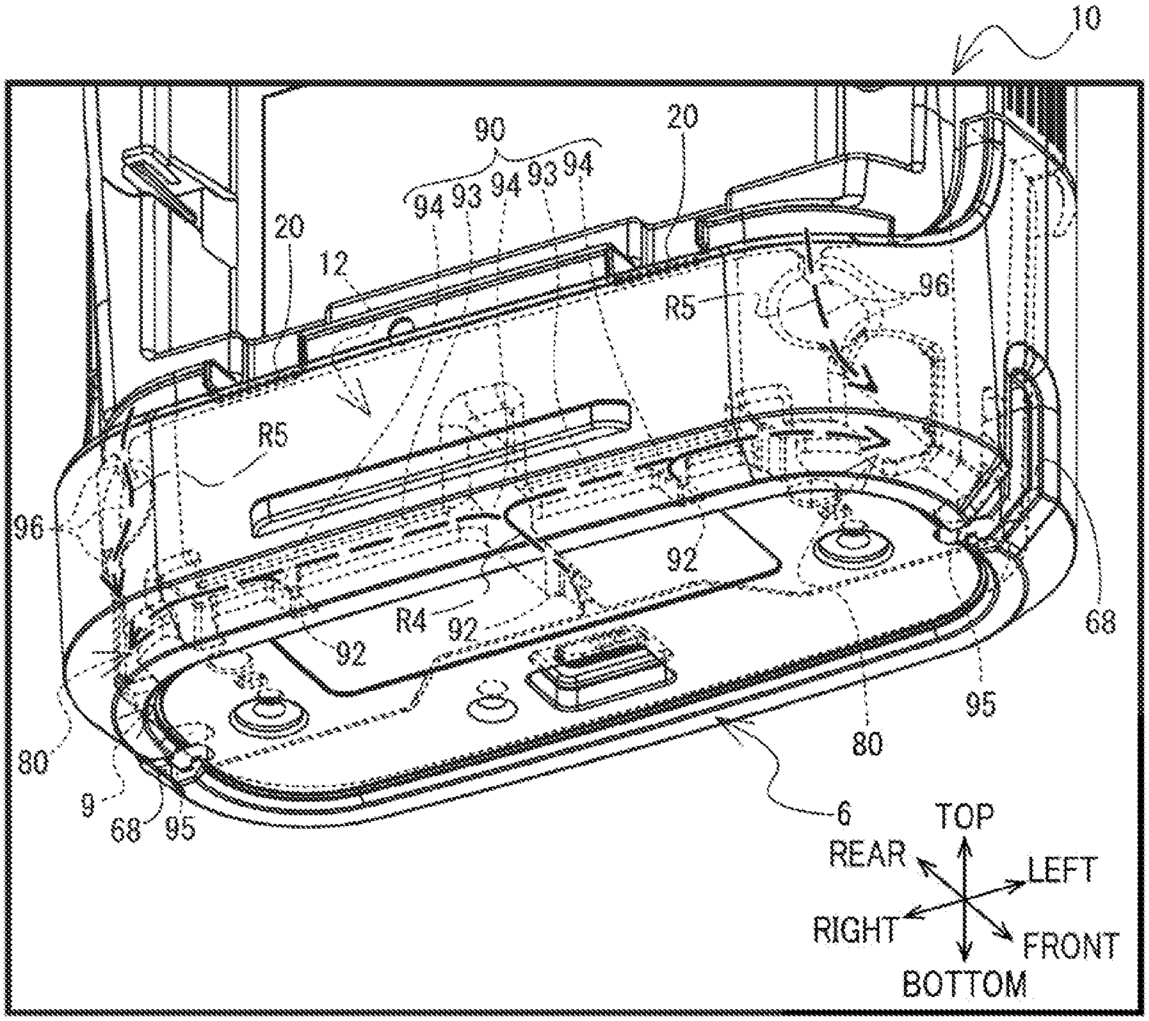
FIG. 11 is a view for description of discharge routes R4 and R5 of liquid that is to be discharged out of the housing 10 in a case where the printing device 1 is held such that the top wall 15 of the housing 10 faces upward.

As illustrated in FIG. 11, the liquid having reached the bottom end portion 9 along the inner surface of the housing 10 is discharged to the outside the housing 10 through the communication holes 92. Hereafter, as indicated by bold broken arrows labelled R4, the liquid flows into the circumferential channel 93 through the connection channels 94, and is then introduced into the chambers 80 and stored therein (i.e., a discharge route R4).

Further, as indicated by bold broken arrows labeled R5 (i.e., a discharge route R5), the liquid flowing along the inner surface of the detachable cover 5 reaches a region between the bottom end of the detachable cover 5 and the bottom edge of the opening 18, and the liquid then flows into the respective drain channels 96. The liquid in the drain channels 96 is then introduced into the chambers 80 and stored in the chambers 80.

Figure 12:
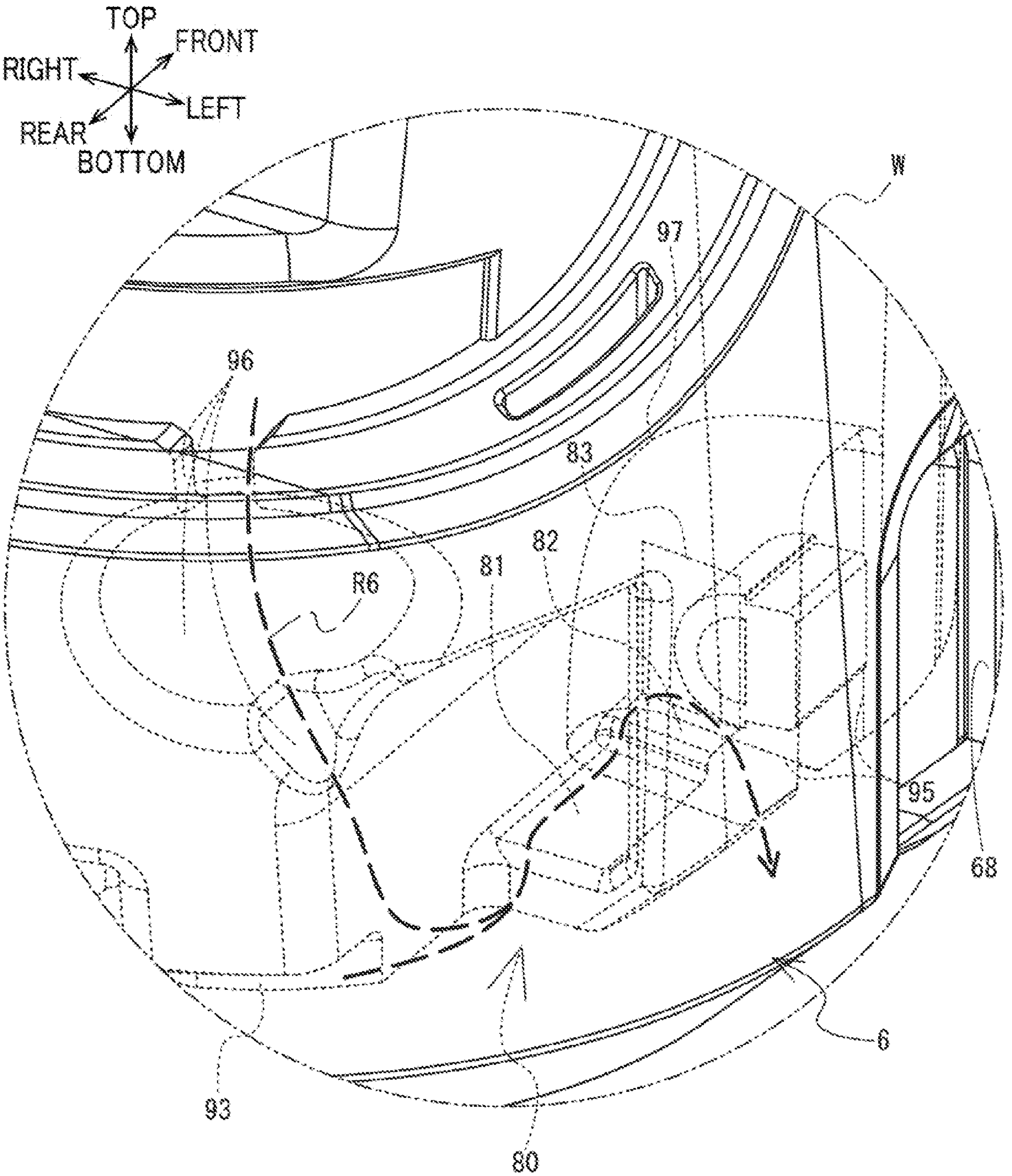
FIG. 12 is an enlarged perspective view of the portion W encircled by the two-dotted chain line in FIG. 9A for description of a discharge route R6 of liquid that is to be discharged from a chamber 80 through a drain hole 95 in a case where the printing device 1 is held such that the top wall 15 of the housing 10 faces upward.

Referring to FIG. 12, the liquid is stored in the chambers 80 as long as the amount of the stored liquid is small, i.e., as long as the level of the stored liquid is lower than the height D1 of the second bottom part 82. When the amount of the liquid stored in the chamber 80 increases and the level of the liquid rises to reach the height D1, the liquid overflows the second bottom part 82 and is discharged to the outside the printing device 1 through the corresponding drain hole 95 and through the corresponding side opening 68 of the bottom cover 6, as indicated by a bold broken arrow labelled R6 (i.e., a discharge route R6).

Figure 13:
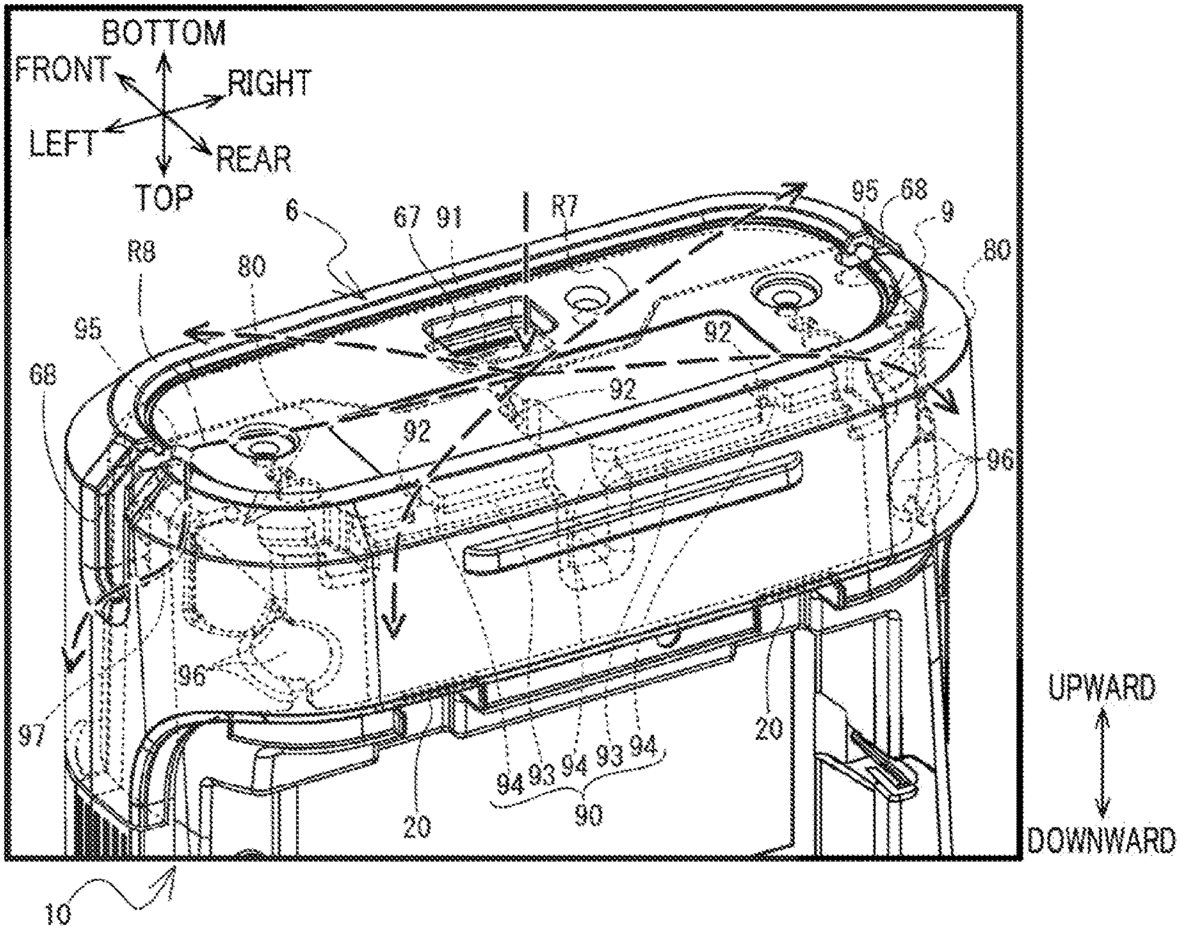
FIG. 13 is a view for description of discharge routes R7 and R8 of liquid that flows into an interior of the bottom cover 6 in a case where the printing device 1 is held such that a bottom wall 16 of the housing 10 faces upward.

Referring to FIG. 13, in a case where liquid falls on the bottom wall 66 of the bottom cover 6 in a state where the printing device 1 is held upside down such that the bottom wall 66 faces upward, the liquid flows along the bottom wall 66 to the outer periphery of the bottom cover 6 and is discharged to the outside, as indicated by bold broken arrows labelled R7 (i.e., a discharge route R7). Here, the liquid does not enter the inside of the housing 10 through the communication holes 92, since the communication holes 92 are covered with the bottom wall 66 and are not exposed to the outside through the bottom cover 6.

In a case where the liquid flowing along the bottom wall 66 enters the drain hole 95 through the corresponding side opening 68, the liquid flows along the inner peripheral surface of the recess 97, and is discharged to the outside through the side opening 68 (more specifically, through an open end of the side opening 68 on the left wall 63), as indicated by a bold broken arrow labelled R8 (i.e., a discharge route R8). Here, even if the liquid flowing in the recess 97 flows further toward the chamber 80 through the opening 83, the liquid is less likely to reach the circumferential channel 93 since the circumferential channel 93 is positioned above the opening 83 while the printing device 1 is used upside down. Therefore, the liquid is less likely to reach the communication holes 92 through the connection channels 94 and the circumferential channel 93, and, hence, the liquid hardly enters inside the housing 10 through the communication holes 92 while the printing device 1 is held upside down.

Figure 14:
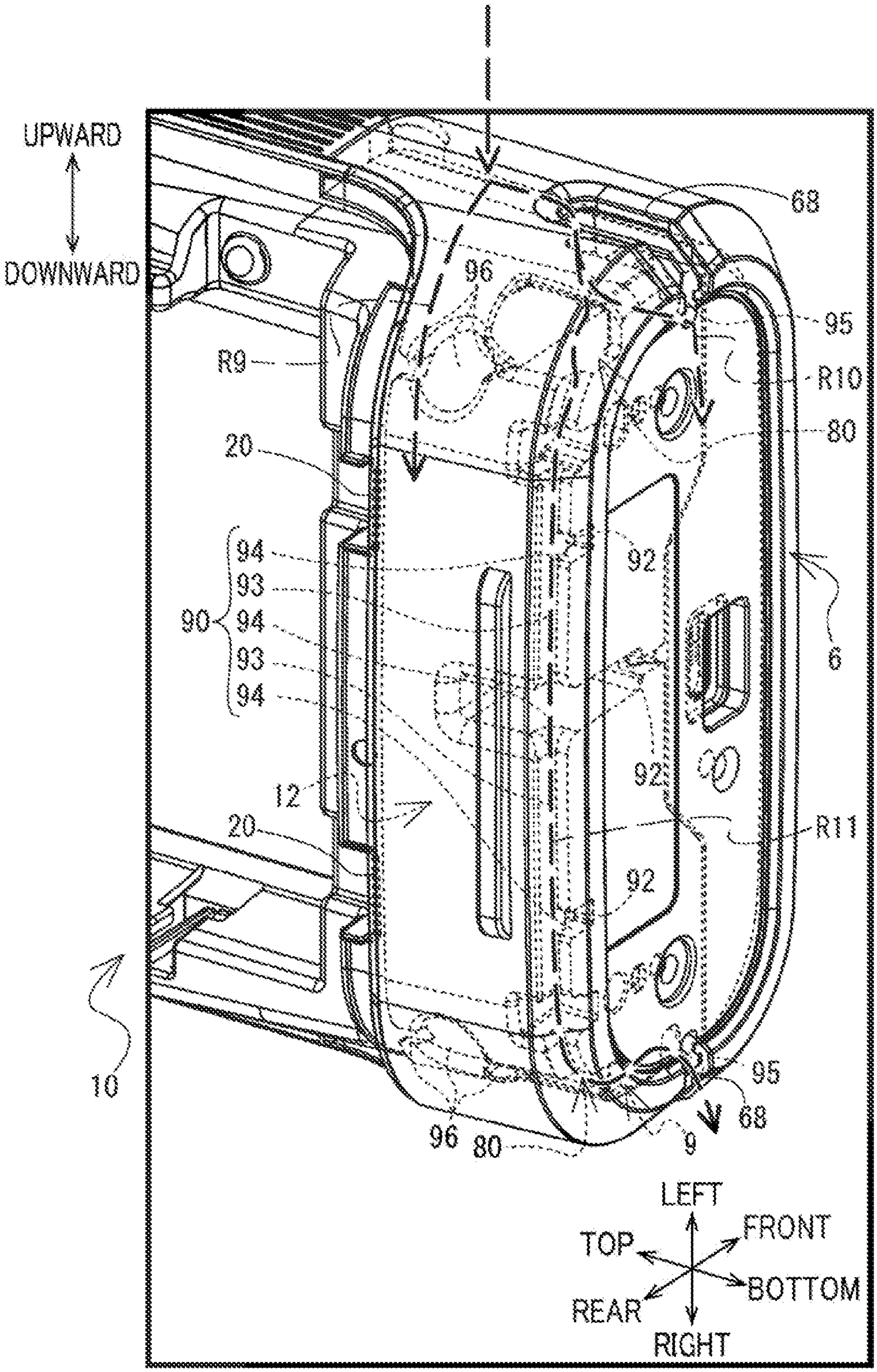
FIG. 14 is a view for description of discharge routes R9, R10, and R11 of liquid that flows into the interior of the bottom cover 6 in a case where the printing device 1 is held such that the left wall 13 of the housing 10 faces upward.

Referring to FIG. 14, in a case where liquid falls on the left wall 63 of the bottom cover 6 in a state where the printing device 1 is used in such a posture that the left wall 13 of the housing 10 faces upward, the liquid flows downward, along the front wall 61, the rear wall 62, or the bottom wall 66, to the outside of the bottom cover 6, as indicated by a bold broken arrow labelled R9 (i.e., a discharge route R9). As described above, since the communication holes 92 are covered with the bottom wall 66 and are not exposed to the outside through the bottom cover 6, the liquid does not enter the inside of the housing 10 through the communication holes 92.

In a case where the liquid flowing along the left wall 63 enters the drain hole 95 through the side opening 68 on the left, the liquid flows along the inner peripheral surface of the recess 97 and is discharged onto the bottom wall 66 through the drain hole 95 and the side opening 68 on the left (more specifically, through open ends of the left drain hole 95 and the left side opening 68 on the bottom wall 66), as indicated by a bold broken arrow labelled R10 (i.e., a discharge route R10).

Still further, the liquid flowing through the left recess 97 may enter the left chamber 80 through the opening 83, and may flow further into the circumferential channel 93. Even in this case, as indicated by a bold broken arrow labelled R11 (i.e., a discharge route R11), since the liquid flows downward along the circumferential channel 93, the liquid is less likely to flow into the connection channels 94 that are branched laterally (horizontally) from the circumferential channel 93. Hence, the liquid flowing through the circumferential channel 93 is less likely to reach the communication holes 92 through the connection channels 94, and hence, the liquid is less likely to penetrate inside the housing 10 through the communication holes 92. As soon as the liquid downwardly flowing through the circumferential channel 93 reaches the right chamber 80, the liquid is introduced into the right recess 97 through the opening 83, and is then discharged to the outside through the drain hole 95 and the side opening 68 on the right side (which now face downward).

As described above, in the printing device 1, the liquid having entered the housing 10 can be discharged to the outside of the housing 10 through the communication holes 92, and then the liquid can be guided to the outside of the printing device 1 through the guide channel 90 (the circumferential channel 93 and the connection channels 94). Further, the liquid is restrained from flowing into the inside of the housing 10 through the communication holes 92.

Further, the bottom end portion 9 of the housing 10 is covered with the bottom cover 6. Hence, entry of liquid into the housing 10 can be restrained.

Further, according to the printing device 1, the liquid having entered inside the housing 10 can be discharged to the outside of the housing 10 through the communication holes 92, and thereafter, the liquid can be guided to the circumferential channel 93 through the connection channels 94, and the liquid can be guided to the outside of the printing device 1 through the circumferential channel 93. In this way, in the printing device 1, external liquid is restrained from reaching the communication holes 92 easily, thereby suppressing entry of the liquid into the housing 10.

The liquid discharged through the communication holes 92 of the housing 10 is guided to the chambers 80 through the guide channel 90, and then is discharged to the outside of the printing device 1. That is, the printing device 1 has a structure for suppressing a backflow of the liquid that is discharged outside the housing 10 to the communication holes 92, thereby restraining entry of the liquid into the inside of the housing 10.

Since the drain holes 95 are provided at lateral sides (left wall 13 and right wall 14) of the housing 10, the liquid having entered the housing can be properly discharged to the outside of the housing 10 through the drain holes 95 while proper protection to the housing 10 is provided by the bottom cover 6.

The drain hole 95 on the left wall 13 can be used for attaching an accessory tool such as a strap to the housing 10. Using the drain hole 95 with the accessory tool attached thereto can reduce an area through which liquid possibly enters the bottom cover 6 from the outside. Further, the user can easily hold the printing device 1 with his single hand by the aid of the accessory tool.

In the printing device 1, liquid guided to the chambers 80 through the circumferential channel 93 is stored in the chambers 80. When the level of the liquid stored in the chambers 80 reaches the level of the connection point between each chamber 80 and the corresponding drain hole 95, the liquid can be discharged to the outside through the drain holes 95.

In a case where the printing device 1 is arranged upside down, the liquid remaining in the guide channel 90 flows into each chamber 80 through the boundary region between the circumferential channel 93 and each chamber 80. Here, the top end of each drain holes 95 is positioned higher than the boundary region in a normal orientation of the printing device 1, i.e., lower than the boundary region in the upside-down posture of the printing device 1. Accordingly, in the printing device 1, the liquid flowing into the chambers 80 through the boundary regions can be discharged to the outside through the drain holes 95.

The liquid adhered to the outer surface of the housing 10 flows down along the outer surface and reaches the upper edge of the bottom cover 6. The liquid is then guided to the chambers 80 through the drain channels 96. In this way, the printing device 1 can properly guide the liquid to the chambers 80, so that the liquid adhered to the outer surface of the housing 10 does not reach the inner bottom surface of the housing 10 through the gap between the outer surface of the bottom end portion 9 of the housing 10 and the inner surface of the bottom cover 6.

Conceivably, there may be a case where liquid having entered the housing 10 is discharged to the outside of the housing 10 through the pair of insertion holes 20. Even in this case, the pair of drain channels 96 can suitably guide the discharged liquid to the chambers 80.

In the bottom end portion 9 of the housing 10, the guide channel 90 is provided at the outer surface of the housing 10 in a form of grooves. Hence, the guide channel 90 can be easily formed in the bottom end portion 9, compared to a case where the guide channel 90 is formed on the inner surface of the bottom cover 6.

The protection ribs 55-60 on the detachable cover 5 are configured to guide the liquid, which has entered the housing 10 and flows along inner surface of the housing 10, to the lateral end portions (outer ends) of the housing 10 in the left-right direction. The liquid having reached the lateral end portions of the housing 10 flows downward toward the bottom end portion 9 of the housing 10. In this way, in the printing device 1, the liquid having entered the housing 10 can be properly guided and discharged to the outside of the printing device 1 to protect the printing head 28 provided in the housing 10 from the liquid inside the housing 10.

The protection ribs 55-60 can properly guide the liquid having entered the housing 10 toward the outside of the housing 10 without interruption of the liquid flow by the reinforcing ribs 54.

In the above-described embodiment, the housing 10 is an example of a "housing" of the disclosure. The bottom cover 6 is an example of a "cover" of the disclosure. The bottom wall 16 is an example of a "bottom wall" of the housing of the disclosure. The communication hole 92 is an example of a "communication hole" of the disclosure. The front wall 11, the rear wall 12, the left wall 13, and the right wall 14 in combination are an example of a "peripheral wall" of the housing of the disclosure. The left wall 13 and the right wall 14 are examples of a "first side wall" and a "second side wall" of the disclosure, and vice versa. The drain hole 95 is an example of a "drain hole" of the disclosure. The side opening 68 is an example of a "cover opening" of the disclosure. The upper end of the drain hole 95 (recess 97) is an example of the "uppermost end of the drain hole" of the disclosure. The detachable cover 5 is an example of a "detachable cover" of the housing of the disclosure. The detachable cover 5 is also an example of a "first wall" of the peripheral wall of the disclosure. The protection ribs 55-60 are examples of a "slanting rib" of the disclosure. The reinforcing ribs 54 is examples of a "reinforcing rib" of the disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the number of the protrusions 51 on the detachable cover 5 need not be two, but may be one or not less than three. Further, the number of the insertion holes 20 may be increased or decreased according to the number of the protrusion 51. Further, the reinforcing ribs 54 and the protection ribs 55-60 may be provided on the inner surfaces of the front wall 11, the left wall 13, and the right wall 14 of the housing 10, instead of the inner surface of the detachable cover 5. Still further, the reinforcing ribs 54 may also function as the protection ribs 55-60.

In the above-described embodiment, the circumferential channel 93 is formed in the outer surface of the rear wall 12 in the bottom end portion 9 of the housing 10. Alternatively, the circumferential channel 93 may be formed in the outer surface of the front wall 11 in the bottom end portion 9 of the housing 10.

Further, in the above-described embodiment, the guide channel 90 is formed in the bottom end portion 9 of the housing 10 in a form of a groove and the open end of the groove is closed by the inner surface of the bottom cover 6, so that the guide channel 90 constitutes a channel to allow liquid flow therethrough. As a modification, the guide channel 90 may be provided in a form of a groove that is recessed from the inner surface of the bottom cover 6, and the open end of the groove may be closed by the outer surface of the bottom end portion 9 of the housing 10 to enable the guide channel 90 to serve as a channel.

Figure 15:
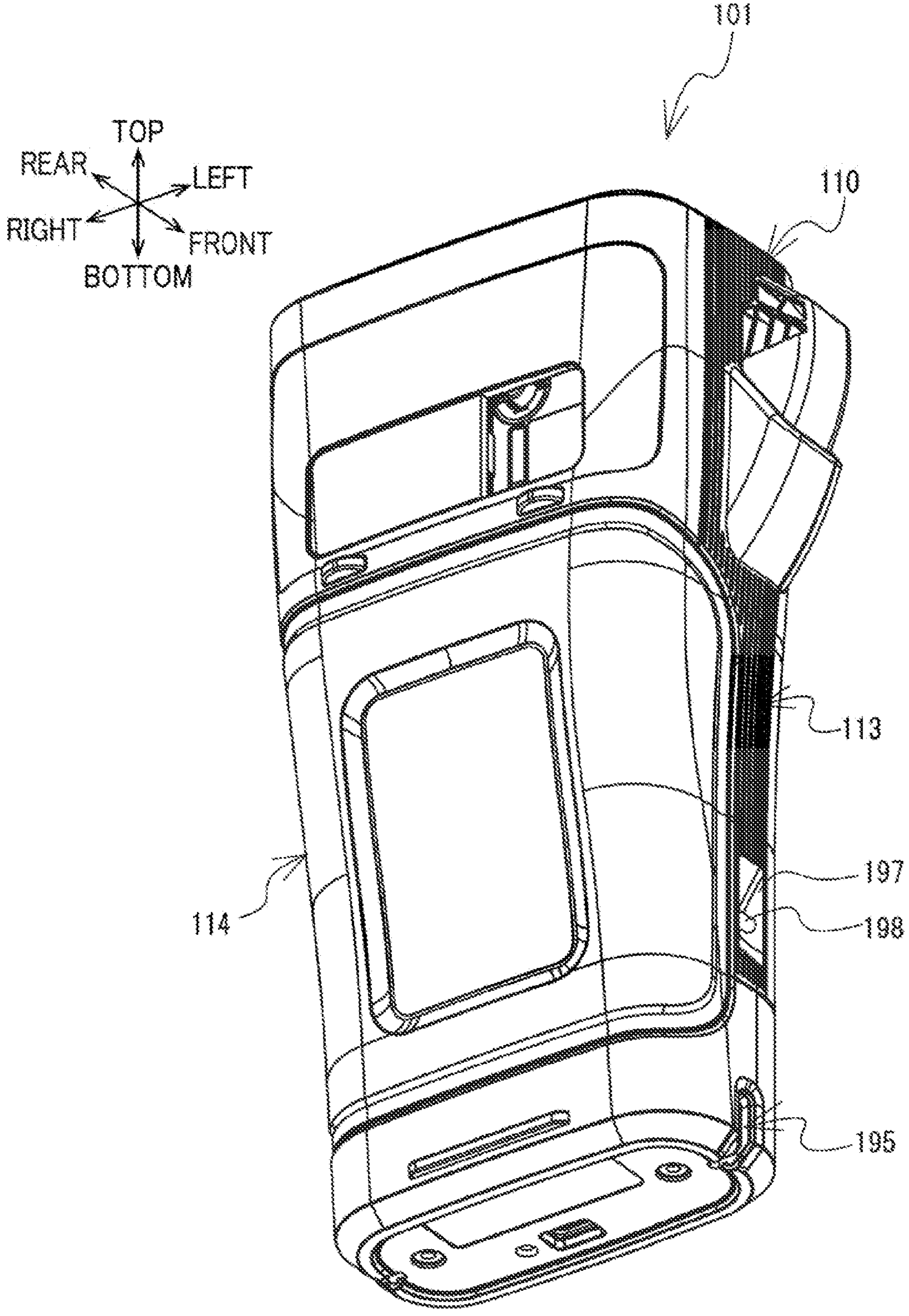
FIG. 15 is a rear perspective view of a printing device 101 according to a modification to the embodiment where a shaft 198 is provided in a recess 197 which is at a different position from a drain hole 195.

FIG. 15 illustrates a printing device 101 according to a modification to the embodiment. In the printing device 101, the attachment mount part 98 of the embodiment (see FIG. 10) is not provided in a drain hole 195 on a left wall 113 of a housing 110. Hence, a mount part for attaching an accessory tool (such as a strap) to the housing 110 may be provided on, for example, an outer surface of the left wall 113.

Specifically, the left wall 113 has a recess 197 that is recessed from the outer surface of the left wall 113. The recess 197 is not in communication with the interior of the housing 110. A shaft 198 made from metal is fixedly positioned in the recess 197. In this modification, the accessory tool (such as a strap) is attached to the shaft 198. In other words, the printing device 101 has, on the left wall 113, the shaft 198 and the recess 197 in combination serving as the attachment mount part 98 of the embodiment, separately from the drain hole 195. Specifically, the shaft 198 is provided inside the recess 197 such that each end of the shaft 198 is fixed to an inner surface of the recess 197. Since the recess 197 is not communicated with the interior of the housing 110, liquid does not enter inside the housing 110 through the recess 197.

As a further modification, the combination of the recess 197 and the shaft 198 may be provided on the outer surface of a right wall 114 of the housing 110, or on both the left wall 113 and the right wall 114. Further, a plurality of pairs of the recess 197 and the shaft 198 may be provided on the left wall 113 and/or on the right wall 114.

What is claimed is:

1. A printing device comprising:

a printing head configured to perform printing on a printing medium;

a housing accommodating therein the printing head, the housing having a bottom wall formed with a communication hole through which liquid that has entered the housing is to be discharged to an outside of the housing;

a cover covering the communication hole in the bottom wall; and a guide channel positioned between the bottom wall and the cover and extending along the bottom wall, the guide channel being in communication with the communication hole and being configured to guide the liquid discharged through the communication hole toward an outside of the printing device.

2. The printing device according to claim 1, wherein the bottom wall faces downward when the printing device is used in a normal posture for operation, wherein the housing further has a peripheral wall extending upward from a periphery of the bottom wall, wherein the housing has a bottom end portion including the bottom wall, and wherein the cover covers the bottom end portion such that the cover covers the bottom wall and a bottom end portion of the peripheral wall.

3. The printing device according to claim 2, wherein the guide channel comprises:

a circumferential channel positioned in the bottom end portion of the housing and extending in a circumferential direction of the housing; and a connection channel in communication with the communication hole and connected to the circumferential channel.

4. The printing device according to claim 3, wherein the peripheral wall includes:

a front wall connected to the bottom wall;

a rear wall facing the front wall and connected to the bottom wall; and first and second side walls opposing each other in a left-right direction and connected to the bottom wall, the first side wall and the second side wall connecting the front wall to the rear wall, wherein the bottom end portion of the housing has a chamber positioned adjacent to the first side wall and covered with the cover, the chamber being in communication with the circumferential channel and being configured to receive the liquid from the guide channel before the liquid is discharged to the outside of the printing device.

5. The printing device according to claim 4, wherein the bottom end portion of the housing has a drain hole in communication with the chamber, the drain hole being open on the first side wall to discharge the liquid in the chamber to the outside of the housing through the drain hole, and wherein the cover has a cover opening that is open to an outside of the cover, the cover opening being positioned in alignment with the drain hole, the liquid in the chamber being to be discharged to the outside of the printing device through the drain hole and the cover opening.

6. The printing device according to claim 5, further comprising an attachment mounting part to which an accessory tool for holding the printing device is attachable, the attachment mounting part being provided in the drain hole and being exposed to the outside of the cover through the cover opening.

7. The printing device according to claim 5, further comprising an attachment mounting part to which an accessory tool for holding the printing device is attachable, wherein the first side wall is formed with a recess at a different position from the drain hole, the attachment mounting part having a rod shape and having both ends fixed to the recess.

8. The printing device according to claim 5, wherein the drain hole is in communication with the chamber at a position above the circumferential channel in the normal posture.

9. The printing device according to claim 8, wherein the drain hole has an uppermost end, the uppermost end of the drain hole being positioned higher than a boundary region between the circumferential channel and the chamber in the normal posture.

10. The printing device according to claim 4, wherein the bottom end portion of the housing has a drain channel extending in a top-bottom direction orthogonal to the left-right direction, the drain channel having one end in communication with the chamber and another end positioned above an upper end of the cover and exposed to an atmosphere.

11. The printing device according to claim 10, wherein the rear wall of the housing has an opening through which the printing head is exposed, wherein the housing includes a detachable cover configured to open and close the opening, the detachable cover constituting a part of the rear wall when the detachable cover closes the opening, the detachable cover having a bottom end from which a protrusion protrudes, wherein the rear wall has a peripheral edge defining the opening, a bottom region in the peripheral edge being formed with an insertion hole in which the protrusion is fitted when the detachable cover closes the opening, and wherein the drain channel is formed in an outer surface of the bottom end portion of the housing, the drain channel being positioned closer to the first side wall than the insertion hole is to the first side wall in the left-right direction.

12. The printing device according to claim 2, wherein the guide channel is in a form of a groove formed in an outer surface of the bottom end portion of the housing.

13. The printing device according to claim 12, wherein the peripheral wall includes:

a first wall positioned above the bottom end portion of the housing and extending in a left-right direction, the first wall defining a center in the left-right direction; and a slanting rib protruding from an inner surface of the first wall, and wherein the slanting rib extends along the inner surface of the first wall from a position near the center in the left-right direction to slope diagonally downward as extending toward an end of the first wall in the left-right direction.

14. The printing device according to claim 13, wherein the peripheral wall further includes a reinforcing rib protruding from the inner surface of the first wall to reinforce the housing, and wherein the slanting rib has a protruding length greater than a protruding length of the reinforcing rib relative to the inner surface of the first wall.

15. The printing device according to claim 13, wherein the peripheral wall is formed with an opening through which the printing head is exposed, and wherein the first wall is a detachable cover configured to open and close the opening.

* * * * *